US010614167B2

(12) United States Patent
Bondarchuk et al.

(10) Patent No.: US 10,614,167 B2
(45) Date of Patent: Apr. 7, 2020

(54) TRANSLATION REVIEW WORKFLOW SYSTEMS AND METHODS

(71) Applicant: SDL plc, Maidenhead, Berkshire (GB)

(72) Inventors: Iurii Bondarchuk, Amstelveen (NL); Lars Moellebjerg, Amsterdam (NL)

(73) Assignee: SDL plc, Maidenhead (GB)

( * ) Notice: Subject to any disclaimer, the term of this patent is extended or adjusted under 35 U.S.C. 154(b) by 292 days.

(21) Appl. No.: 15/335,363

(22) Filed: Oct. 26, 2016

(65) Prior Publication Data
US 2017/0124069 A1 May 4, 2017

Related U.S. Application Data

(60) Provisional application No. 62/249,027, filed on Oct. 30, 2015.

(51) Int. Cl.
G06F 17/28 (2006.01)
G06F 17/21 (2006.01)

(52) U.S. Cl.
CPC ......... G06F 17/289 (2013.01); G06F 17/212 (2013.01); G06F 17/2836 (2013.01)

(58) Field of Classification Search
None
See application file for complete search history.

(56) References Cited

U.S. PATENT DOCUMENTS 4,845,658 A 7/1989 Gifford
4,916,614 A 4/1990 Kaji
4,920,499 A 4/1990 Skeirik
5,075,850 A 12/1991 Asahioka et al.
5,295,068 A 3/1994 Nishino et al.
5,351,189 A 9/1994 Doi
5,418,717 A 5/1995 Su et al.
5,477,451 A 12/1995 Brown et al.
5,497,319 A 3/1996 Chong et al.
5,640,575 A 6/1997 Maruyama
5,644,775 A 7/1997 Thompson et al.
5,675,802 A 10/1997 Allen et al.
5,708,780 A 1/1998 Levergood et al.
(Continued)

FOREIGN PATENT DOCUMENTS

AU 5240198 A 5/1998
AU 694367 B2 7/1998
(Continued)

OTHER PUBLICATIONS

Summons to Attend Oral Proceedings, European Patent Application No. 12703483.3, dated Nov. 30, 2017, 11 pages.
(Continued)

Primary Examiner — Howard Cortes
(74) Attorney, Agent, or Firm — Carr & Ferrell LLP

(57) ABSTRACT

Translation review workflow systems and methods are disclosed herein. Some embodiments include a web content management system having a translation preview agent, the web content management system managing web content for publishing, a translation system that manages translation content of the web content, and a translation preview service that generates a translation preview of the web content with the translated content that is embedded within the web content to maintain context for a translator.

10 Claims, 10 Drawing Sheets

(56) References Cited

U.S. PATENT DOCUMENTS

| | | |
|---|---|---|
| 5,715,314 A | 2/1998 | Payne et al. |
| 5,724,424 A | 3/1998 | Gifford |
| 5,751,957 A | 5/1998 | Hiroya et al. |
| 5,774,868 A | 6/1998 | Cragun et al. |
| 5,812,776 A | 9/1998 | Gifford |
| 5,813,007 A | 9/1998 | Nielsen |
| 5,873,056 A | 2/1999 | Liddy |
| 5,884,097 A | 3/1999 | Li et al. |
| 5,884,246 A | 3/1999 | Boucher et al. |
| 5,894,554 A | 4/1999 | Lowery et al. |
| 5,895,446 A | 4/1999 | Takeda et al. |
| 5,909,492 A | 6/1999 | Payne et al. |
| 5,966,685 A | 10/1999 | Flanagan et al. |
| 5,974,372 A | 10/1999 | Barnes |
| 5,978,828 A | 11/1999 | Greer et al. |
| 5,987,401 A | 11/1999 | Trudeau |
| 5,987,402 A | 11/1999 | Murata et al. |
| 6,026,413 A | 2/2000 | Challenger et al. |
| 6,041,333 A | 3/2000 | Bretschneider et al. |
| 6,041,360 A | 3/2000 | Himmel et al. |
| 6,044,344 A | 3/2000 | Kanevsky |
| 6,049,785 A | 4/2000 | Gifford |
| 6,085,162 A | 7/2000 | Cherny |
| 6,092,035 A | 7/2000 | Kurachi et al. |
| 6,108,703 A | 8/2000 | Leighton et al. |
| 6,122,666 A | 9/2000 | Beurket et al. |
| 6,128,652 A | 10/2000 | Toh et al. |
| 6,128,655 A | 10/2000 | Fields et al. |
| 6,161,082 A | 12/2000 | Goldberg et al. |
| 6,163,785 A | 12/2000 | Carbonell et al. |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,216,212 B1 | 4/2001 | Challenger et al. |
| 6,219,818 B1 | 4/2001 | Freivald et al. |
| 6,256,712 B1 | 7/2001 | Challenger et al. |
| 6,263,332 B1 | 7/2001 | Nasr et al. |
| 6,278,969 B1 | 8/2001 | King et al. |
| 6,279,112 B1 | 8/2001 | O'toole, Jr. et al. |
| 6,330,566 B1 | 12/2001 | Durham |
| 6,330,598 B1 | 12/2001 | Beckwith et al. |
| 6,338,033 B1 | 1/2002 | Bourbonnais et al. |
| 6,347,316 B1 | 2/2002 | Redpath |
| 6,356,865 B1 | 3/2002 | Franz et al. |
| 6,356,903 B1 | 3/2002 | Baxter et al. |
| 6,363,337 B1 | 3/2002 | Amith |
| 6,401,105 B1 | 6/2002 | Carlin et al. |
| 6,415,257 B1 | 7/2002 | Junqua |
| 6,438,540 B2 | 8/2002 | Nasr et al. |
| 6,449,599 B1 | 9/2002 | Payne et al. |
| 6,477,524 B1 | 11/2002 | Taskiran |
| 6,477,575 B1 | 11/2002 | Koeppel et al. |
| 6,490,358 B1 | 12/2002 | Geer et al. |
| 6,490,563 B2 | 12/2002 | Hon |
| 6,526,426 B1 | 2/2003 | Lakritz |
| 6,581,061 B2 | 6/2003 | Graham |
| 6,623,529 B1 | 9/2003 | Lakritz |
| 6,658,627 B1 | 12/2003 | Gallup |
| 6,725,333 B1 | 4/2004 | Degenaro et al. |
| 6,748,569 B1 | 6/2004 | Brooke et al. |
| 6,782,384 B2 | 8/2004 | Sloan et al. |
| 6,865,528 B1 | 3/2005 | Huang |
| 6,920,419 B2 | 7/2005 | Kitamura |
| 6,973,656 B1 | 12/2005 | Huynh et al. |
| 6,976,207 B1 | 12/2005 | Rujan |
| 6,990,439 B2 | 1/2006 | Xun |
| 7,013,264 B2 | 3/2006 | Dolan |
| 7,031,908 B1 | 4/2006 | Huang |
| 7,050,964 B2 | 5/2006 | Menzes |
| 7,089,493 B2 | 8/2006 | Hatori et al. |
| 7,111,229 B2 | 9/2006 | Nicholas et al. |
| 7,124,092 B2 | 10/2006 | O'toole, Jr. et al. |
| 7,177,792 B2 | 2/2007 | Knight |
| 7,191,447 B1 | 3/2007 | Ellis et al. |
| 7,207,005 B2 * | 4/2007 | Lakritz .............. G06F 17/2258 709/203 |
| 7,209,875 B2 | 4/2007 | Quirk |
| 7,249,013 B2 | 7/2007 | Al-Onaizan |
| 7,249,314 B2 | 7/2007 | Walker et al. |
| 7,272,639 B1 | 9/2007 | Levergood et al. |
| 7,295,962 B2 | 11/2007 | Marcu |
| 7,295,963 B2 | 11/2007 | Richardson et al. |
| 7,302,429 B1 | 11/2007 | Blanker |
| 7,333,927 B2 | 2/2008 | Lee |
| 7,340,388 B2 | 3/2008 | Soricut |
| 7,353,165 B2 | 4/2008 | Zhou |
| 7,369,984 B2 | 5/2008 | Fairweather |
| 7,383,320 B1 | 6/2008 | Silberstein et al. |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,606,814 B2 | 10/2009 | Deily et al. |
| 7,620,538 B2 | 11/2009 | Marcu |
| 7,620,549 B2 | 11/2009 | Di Cristo |
| 7,624,005 B2 | 11/2009 | Koehn |
| 7,668,782 B1 | 2/2010 | Reistad et al. |
| 7,680,647 B2 | 3/2010 | Moore |
| 7,698,126 B2 | 4/2010 | Kohlmeier et al. |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,836,057 B1 | 11/2010 | Micaelian et al. |
| 7,865,358 B2 | 1/2011 | Green |
| 7,904,595 B2 | 3/2011 | Cheng et al. |
| 7,925,493 B2 | 4/2011 | Watanabe |
| 7,945,437 B2 | 5/2011 | Mount et al. |
| 7,949,633 B1 | 5/2011 | Shaver et al. |
| 7,958,453 B1 | 6/2011 | Taing |
| 7,983,896 B2 | 7/2011 | Ross |
| 7,983,897 B2 | 7/2011 | Chin |
| 8,015,222 B2 | 9/2011 | Abnous et al. |
| 8,078,450 B2 | 12/2011 | Anisimovich et al. |
| 8,135,575 B1 | 3/2012 | Dean |
| 8,185,830 B2 | 5/2012 | Saha et al. |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,260,846 B2 | 9/2012 | Lahav |
| 8,286,185 B2 | 10/2012 | Ellis et al. |
| 8,296,127 B2 | 10/2012 | Marcu |
| 8,296,463 B2 | 10/2012 | Cheng et al. |
| 8,346,585 B1 * | 1/2013 | Griffith .............. G06Q 30/0623 705/7.11 |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,413,045 B2 | 4/2013 | Lemonik et al. |
| 8,423,346 B2 | 4/2013 | Seo et al. |
| 8,442,812 B2 | 5/2013 | Ehsani |
| 8,453,052 B1 | 5/2013 | Newman et al. |
| 8,489,980 B2 | 7/2013 | Lakritz |
| 8,521,506 B2 | 8/2013 | Lancaster et al. |
| 8,527,260 B2 | 9/2013 | Best |
| 8,548,794 B2 | 10/2013 | Koehn |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,671,214 B2 | 3/2014 | Lockhart et al. |
| 8,676,804 B1 | 3/2014 | Janos et al. |

(56) References Cited

U.S. PATENT DOCUMENTS

| | | | |
|---|---|---|---|
| 8,683,329 B2* | 3/2014 | Tang | G06F 17/289 707/706 |
| 8,688,454 B2 | 4/2014 | Zheng | |
| 8,725,496 B2 | 5/2014 | Zhao | |
| 8,768,686 B2 | 7/2014 | Sarikaya et al. | |
| 8,775,154 B2 | 7/2014 | Clinchant | |
| 8,799,200 B2 | 8/2014 | Lahav | |
| 8,818,790 B2 | 8/2014 | He et al. | |
| 8,843,359 B2 | 9/2014 | Lauder | |
| 8,862,456 B2 | 10/2014 | Krack et al. | |
| 8,898,052 B2 | 11/2014 | Waibel | |
| 8,903,707 B2 | 12/2014 | Zhao | |
| 8,909,683 B1 | 12/2014 | Ledet | |
| 8,930,176 B2 | 1/2015 | Li | |
| 8,935,148 B2 | 1/2015 | Christ | |
| 8,935,149 B2 | 1/2015 | Zhang | |
| 8,935,150 B2 | 1/2015 | Christ | |
| 8,935,706 B2 | 1/2015 | Ellis et al. | |
| 8,954,539 B2 | 2/2015 | Lahav | |
| 8,972,268 B2 | 3/2015 | Waibel | |
| 9,026,425 B2 | 5/2015 | Nikoulina | |
| 9,053,202 B2 | 6/2015 | Viswanadha | |
| 9,081,762 B2 | 7/2015 | Wu | |
| 9,141,606 B2 | 9/2015 | Marciano | |
| 9,176,952 B2 | 11/2015 | Aikawa | |
| 9,183,192 B1 | 11/2015 | Ruby, Jr. | |
| 9,183,198 B2 | 11/2015 | Shen et al. | |
| 9,201,870 B2 | 12/2015 | Jurach | |
| 9,208,144 B1 | 12/2015 | Abdulnasyrov | |
| 9,317,622 B1 | 4/2016 | Zuromski et al. | |
| 9,336,487 B2 | 5/2016 | Lahav | |
| 9,369,489 B2 | 6/2016 | Kato | |
| 9,396,184 B2 | 7/2016 | Roy | |
| 9,396,436 B2 | 7/2016 | Lahav | |
| 9,430,449 B2 | 8/2016 | Leblond et al. | |
| 9,465,797 B2 | 10/2016 | Ji | |
| 9,471,563 B2 | 10/2016 | Trese | |
| 9,471,920 B2 | 10/2016 | Kolkowitz et al. | |
| 9,519,640 B2 | 12/2016 | Perez | |
| 9,519,682 B1 | 12/2016 | Pujara et al. | |
| 9,547,626 B2* | 1/2017 | de Voogd | G06F 17/30893 |
| 9,552,355 B2 | 1/2017 | Dymetman | |
| 9,596,188 B2 | 3/2017 | Cheng et al. | |
| 9,600,473 B2 | 3/2017 | Leydon | |
| 9,613,026 B2 | 4/2017 | Hodson | |
| 9,773,270 B2 | 9/2017 | Costa et al. | |
| 9,781,050 B2 | 10/2017 | Cheng et al. | |
| 9,954,794 B2 | 4/2018 | Cheng et al. | |
| 10,025,776 B1* | 7/2018 | Sjoberg | G06F 17/2854 |
| 10,061,749 B2 | 8/2018 | Homer et al. | |
| 10,452,740 B2 | 10/2019 | Leblond et al. | |
| 10,521,492 B2 | 12/2019 | Homer et al. | |
| 2001/0029507 A1 | 10/2001 | Nojima | |
| 2002/0007383 A1 | 1/2002 | Yoden et al. | |
| 2002/0010590 A1* | 1/2002 | Lee | G06F 17/2872 704/277 |
| 2002/0023101 A1 | 2/2002 | Kurihara et al. | |
| 2002/0046018 A1 | 4/2002 | Marcu | |
| 2002/0065848 A1 | 5/2002 | Walker et al. | |
| 2002/0083103 A1 | 6/2002 | Ballance | |
| 2002/0103698 A1 | 8/2002 | Cantrell | |
| 2002/0112013 A1 | 8/2002 | Walsh | |
| 2002/0120762 A1 | 8/2002 | Cheng et al. | |
| 2002/0124109 A1 | 9/2002 | Brown | |
| 2002/0178166 A1 | 11/2002 | Hsia | |
| 2002/0178257 A1 | 11/2002 | Cerrato | |
| 2002/0193983 A1* | 12/2002 | Tokieda | G06F 17/289 704/2 |
| 2003/0009320 A1 | 1/2003 | Furuta | |
| 2003/0023757 A1 | 1/2003 | Ishioka et al. | |
| 2003/0158953 A1 | 8/2003 | Lal | |
| 2003/0163346 A1 | 8/2003 | Tinti et al. | |
| 2003/0200094 A1 | 10/2003 | Gupta | |
| 2004/0010496 A1 | 1/2004 | Behrendt et al. | |
| 2004/0015723 A1 | 1/2004 | Pham et al. | |
| 2004/0019849 A1 | 1/2004 | Weng et al. | |
| 2004/0034520 A1 | 2/2004 | Langkilde-Geary | |
| 2004/0039593 A1 | 2/2004 | Eskandari | |
| 2004/0044517 A1 | 3/2004 | Palmquist | |
| 2004/0044576 A1 | 3/2004 | Kurihara et al. | |
| 2004/0148409 A1 | 7/2004 | Davis et al. | |
| 2004/0187090 A1 | 9/2004 | Meacham | |
| 2004/0255281 A1 | 12/2004 | Imamura et al. | |
| 2005/0039116 A1 | 2/2005 | Slack-Smith | |
| 2005/0086105 A1 | 4/2005 | McFadden et al. | |
| 2005/0156714 A1 | 7/2005 | McCarthy et al. | |
| 2005/0171944 A1 | 8/2005 | Palmquist | |
| 2005/0187774 A1* | 8/2005 | Vuong | G06F 17/289 704/277 |
| 2005/0189415 A1 | 9/2005 | Fano et al. | |
| 2005/0203884 A1 | 9/2005 | Allen et al. | |
| 2005/0228865 A1 | 10/2005 | Hirsch | |
| 2005/0235351 A1 | 10/2005 | Seltzer et al. | |
| 2005/0246283 A1 | 11/2005 | Gwiazda et al. | |
| 2006/0041558 A1 | 2/2006 | McCauley et al. | |
| 2006/0053367 A1 | 3/2006 | Chen et al. | |
| 2006/0080257 A1 | 4/2006 | Vaughan et al. | |
| 2006/0080265 A1 | 4/2006 | Hinds et al. | |
| 2006/0080397 A1 | 4/2006 | Chene et al. | |
| 2006/0095526 A1 | 5/2006 | Levergood et al. | |
| 2006/0178918 A1 | 8/2006 | Mikurak | |
| 2006/0248442 A1 | 11/2006 | Rosenstein et al. | |
| 2006/0282255 A1 | 12/2006 | Lu | |
| 2007/0016363 A1 | 1/2007 | Huang et al. | |
| 2007/0022003 A1 | 1/2007 | Chao et al. | |
| 2007/0033104 A1 | 2/2007 | Collins et al. | |
| 2007/0043553 A1 | 2/2007 | Dolan | |
| 2007/0047781 A1 | 3/2007 | Hull et al. | |
| 2007/0048714 A1 | 3/2007 | Plastina et al. | |
| 2007/0083425 A1 | 4/2007 | Cousineau et al. | |
| 2007/0112553 A1 | 5/2007 | Jacobson | |
| 2007/0118545 A1 | 5/2007 | Chandrasekharan et al. | |
| 2007/0192374 A1 | 8/2007 | Abnous et al. | |
| 2007/0208991 A1 | 9/2007 | Rider | |
| 2007/0209005 A1 | 9/2007 | Shaver et al. | |
| 2007/0209080 A1 | 9/2007 | Ture et al. | |
| 2007/0226058 A1 | 9/2007 | Lorenzen et al. | |
| 2007/0234213 A1 | 10/2007 | Krikorian et al. | |
| 2008/0028300 A1 | 1/2008 | Krieger et al. | |
| 2008/0086298 A1 | 4/2008 | Anismovich | |
| 2008/0109374 A1 | 5/2008 | Levergood et al. | |
| 2008/0120089 A1* | 5/2008 | Schurig | G06F 17/2288 704/2 |
| 2008/0120120 A1 | 5/2008 | Cirulli et al. | |
| 2008/0154577 A1 | 6/2008 | Kim | |
| 2008/0195664 A1 | 8/2008 | Maharajh et al. | |
| 2008/0201344 A1 | 8/2008 | Levergood et al. | |
| 2008/0209320 A1 | 8/2008 | Mawhinney et al. | |
| 2008/0244053 A1 | 10/2008 | Sampson et al. | |
| 2008/0256235 A1 | 10/2008 | Or Sim et al. | |
| 2008/0270398 A1 | 10/2008 | Landau et al. | |
| 2008/0288240 A1 | 11/2008 | D'Agostini et al. | |
| 2008/0316228 A1 | 12/2008 | Seljavaara | |
| 2009/0061764 A1 | 3/2009 | Lockhart et al. | |
| 2009/0094017 A1 | 4/2009 | Chen et al. | |
| 2009/0099931 A1 | 4/2009 | Aaltonen et al. | |
| 2009/0138458 A1 | 5/2009 | Wanker | |
| 2009/0197580 A1 | 8/2009 | Gupta et al. | |
| 2009/0217196 A1 | 8/2009 | Neff et al. | |
| 2009/0217352 A1 | 8/2009 | Shen et al. | |
| 2009/0234711 A1 | 9/2009 | Ramer et al. | |
| 2009/0240539 A1 | 9/2009 | Slawson | |
| 2009/0248801 A1 | 10/2009 | Then et al. | |
| 2009/0259684 A1 | 10/2009 | Knight et al. | |
| 2009/0313005 A1 | 12/2009 | Jaquinta | |
| 2009/0313245 A1 | 12/2009 | Weyl et al. | |
| 2010/0017704 A1 | 1/2010 | Jaffe et al. | |
| 2010/0023475 A1 | 1/2010 | Lahav | |
| 2010/0023581 A1 | 1/2010 | Lahav | |
| 2010/0057439 A1 | 3/2010 | Ideuchi et al. | |
| 2010/0057561 A1 | 3/2010 | Gifford | |
| 2010/0070364 A1 | 3/2010 | Dugan | |
| 2010/0070843 A1 | 3/2010 | Duym | |
| 2010/0121630 A1 | 5/2010 | Mende et al. | |

(56) References Cited

U.S. PATENT DOCUMENTS

| | | |
|---|---|---|
| 2010/0153404 A1 | 6/2010 | Ghosh et al. |
| 2010/0179803 A1 | 7/2010 | Sawaf |
| 2010/0211865 A1 | 8/2010 | Fanning et al. |
| 2010/0217783 A1 | 8/2010 | Farver et al. |
| 2010/0233996 A1 | 9/2010 | Herz et al. |
| 2010/0242069 A1 | 9/2010 | Jung et al. |
| 2010/0257457 A1 | 10/2010 | De Goes |
| 2010/0274661 A1 | 10/2010 | Aaltonen et al. |
| 2010/0281008 A1 | 11/2010 | Braunwarth |
| 2010/0305940 A1* | 12/2010 | Dendi ............... G06F 17/289 704/3 |
| 2010/0306402 A1 | 12/2010 | Russell et al. |
| 2010/0312619 A1 | 12/2010 | Ala-Pietila et al. |
| 2011/0010243 A1 | 1/2011 | Wilburn et al. |
| 2011/0022381 A1 | 1/2011 | Gao et al. |
| 2011/0047468 A1 | 2/2011 | Ishizaka |
| 2011/0060998 A1 | 3/2011 | Schwartz et al. |
| 2011/0066469 A1 | 3/2011 | Kadosh |
| 2011/0078626 A1 | 3/2011 | Bachman et al. |
| 2011/0097693 A1 | 4/2011 | Crawford |
| 2011/0125783 A1 | 5/2011 | Whale et al. |
| 2011/0191458 A1* | 8/2011 | Cheng ............... G06F 17/3089 709/223 |
| 2011/0264736 A1 | 10/2011 | Zuckerberg et al. |
| 2011/0270975 A1 | 11/2011 | Troup |
| 2011/0313754 A1* | 12/2011 | Bastide ............... G06F 17/289 704/2 |
| 2012/0016655 A1* | 1/2012 | Travieso ............ G06F 17/2827 704/2 |
| 2012/0022852 A1 | 1/2012 | Tregaskis |
| 2012/0023129 A1 | 1/2012 | Vedula et al. |
| 2012/0042006 A1 | 2/2012 | Kiley et al. |
| 2012/0096366 A1 | 4/2012 | Narla et al. |
| 2012/0131441 A1 | 5/2012 | Jitkoff et al. |
| 2012/0136718 A1 | 5/2012 | Katti |
| 2012/0143816 A1 | 6/2012 | Zhang et al. |
| 2012/0185759 A1 | 7/2012 | Balinsky et al. |
| 2012/0197718 A1 | 8/2012 | Martchenko et al. |
| 2012/0197770 A1 | 8/2012 | Raheja et al. |
| 2012/0197957 A1 | 8/2012 | de Voogd |
| 2012/0203861 A1 | 8/2012 | Flack et al. |
| 2012/0221319 A1 | 8/2012 | Trese |
| 2012/0221407 A1 | 8/2012 | Erasmus et al. |
| 2012/0233665 A1 | 9/2012 | Ranganathan et al. |
| 2012/0266076 A1 | 10/2012 | Lockhart et al. |
| 2012/0330644 A1* | 12/2012 | Giraudy ............... G06F 17/289 704/3 |
| 2012/0330990 A1 | 12/2012 | Chen et al. |
| 2013/0031470 A1 | 1/2013 | Daly, Jr. et al. |
| 2013/0036202 A1 | 2/2013 | Lahav |
| 2013/0054404 A1 | 2/2013 | Garcia |
| 2013/0067055 A1 | 3/2013 | Cheng et al. |
| 2013/0091014 A1 | 4/2013 | Kellogg |
| 2013/0097488 A1 | 4/2013 | Coman et al. |
| 2013/0124185 A1* | 5/2013 | Sarr ............... G06F 17/289 704/2 |
| 2013/0124987 A1 | 5/2013 | Lakritz |
| 2013/0144566 A1 | 6/2013 | De Biswas |
| 2013/0151940 A1 | 6/2013 | Bailor et al. |
| 2013/0173247 A1 | 7/2013 | Hodson |
| 2013/0262986 A1* | 10/2013 | Leblond ............... G06F 17/212 715/236 |
| 2013/0304607 A1 | 11/2013 | Costa et al. |
| 2013/0325442 A1 | 12/2013 | Dahlmeier |
| 2013/0326345 A1 | 12/2013 | Haggart et al. |
| 2014/0019625 A1 | 1/2014 | Cheng et al. |
| 2014/0058718 A1 | 2/2014 | Kunchukuttan |
| 2014/0081775 A1 | 3/2014 | Leblond et al. |
| 2014/0082032 A1 | 3/2014 | Leblond et al. |
| 2014/0087760 A1 | 3/2014 | Bennett |
| 2014/0114864 A1 | 4/2014 | Babich et al. |
| 2014/0142917 A1 | 5/2014 | D'Penha |
| 2014/0142918 A1 | 5/2014 | Dotterer |
| 2014/0173414 A1 | 6/2014 | Chan et al. |
| 2014/0181013 A1 | 6/2014 | Micucci et al. |
| 2014/0229257 A1 | 8/2014 | Reistad et al. |
| 2014/0236942 A1 | 8/2014 | Li |
| 2014/0250369 A1 | 9/2014 | Mitnick et al. |
| 2014/0278342 A1* | 9/2014 | Shoshan ............... G06F 17/289 704/2 |
| 2014/0282977 A1 | 9/2014 | Madhu et al. |
| 2014/0297252 A1 | 10/2014 | Prasad et al. |
| 2014/0297759 A1 | 10/2014 | Mody |
| 2014/0298483 A1 | 10/2014 | Kato |
| 2014/0304080 A1 | 10/2014 | Yilmaz |
| 2014/0310229 A1 | 10/2014 | Lahav |
| 2014/0351053 A1 | 11/2014 | Link |
| 2014/0358519 A1 | 12/2014 | Mirkin |
| 2014/0358524 A1 | 12/2014 | Papula |
| 2014/0365201 A1 | 12/2014 | Gao |
| 2015/0040000 A1 | 2/2015 | Rice et al. |
| 2015/0051896 A1 | 2/2015 | Simard |
| 2015/0052424 A1* | 2/2015 | Sikchi ............... G06F 17/2264 715/239 |
| 2015/0074518 A1 | 3/2015 | Rumsey et al. |
| 2015/0106390 A1 | 4/2015 | Fuchs |
| 2015/0127660 A1 | 5/2015 | Zilberberg et al. |
| 2015/0149885 A1 | 5/2015 | Homer et al. |
| 2015/0149886 A1 | 5/2015 | Homer et al. |
| 2015/0186362 A1 | 7/2015 | Li |
| 2015/0188961 A1 | 7/2015 | Ricci |
| 2015/0213259 A1* | 7/2015 | Du ............... H04L 63/1466 726/27 |
| 2015/0213363 A1 | 7/2015 | Lahav |
| 2015/0254732 A1 | 9/2015 | Snyder |
| 2015/0310504 A1 | 10/2015 | Potter |
| 2016/0014088 A1* | 1/2016 | Maekawa ............ H04L 67/141 726/12 |
| 2016/0019546 A1 | 1/2016 | Eisen |
| 2016/0248785 A1* | 8/2016 | Petry ............... H04L 63/10 |
| 2016/0275057 A1* | 9/2016 | Dendi ............... H04L 67/02 |
| 2017/0149683 A1 | 5/2017 | Cheng et al. |
| 2017/0337614 A1 | 11/2017 | Costa et al. |
| 2018/0314674 A1 | 11/2018 | Homer et al. |
| 2019/0065514 A1 | 2/2019 | Siddiquee et al. |
| 2019/0158567 A1 | 5/2019 | Siddiquee et al. |

FOREIGN PATENT DOCUMENTS

| | | |
|---|---|---|
| AU | 5202299 A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 0803103 A1 | 2/2002 |
| EP | 1235177 A2 | 8/2002 |
| EP | 0734556 B1 | 9/2002 |
| EP | 0830774 B1 | 10/2004 |
| EP | 1489523 A2 | 12/2004 |
| EP | 1170680 A2 | 8/2005 |
| EP | 2299369 A1 | 3/2011 |
| EP | 2668599 A1 | 12/2013 |
| EP | 2668626 A1 | 12/2013 |
| EP | 2678814 A1 | 1/2014 |
| EP | 2896007 A1 | 7/2015 |
| EP | 2896008 A1 | 7/2015 |
| GB | 2241359 A | 8/1991 |
| JP | H10509543 A | 9/1998 |
| JP | H11507752 A | 7/1999 |
| JP | 2001117847 A | 4/2001 |
| JP | 2001136583 A | 5/2001 |
| JP | 3190881 B2 | 7/2001 |
| JP | 3190882 B2 | 7/2001 |
| JP | 2001188992 A | 7/2001 |
| JP | 2001350790 A | 12/2001 |

(56) References Cited

FOREIGN PATENT DOCUMENTS

| | | |
|---|---|---|
| JP | 3260693 B2 | 2/2002 |
| JP | 2002073677 A | 3/2002 |
| JP | 2002132822 A | 5/2002 |
| JP | 3367675 B2 | 1/2003 |
| JP | 2003032660 A | 1/2003 |
| JP | 2003157402 A | 5/2003 |
| JP | 2003216608 A | 7/2003 |
| JP | 2004538542 A | 12/2004 |
| JP | 2005056080 A | 3/2005 |
| JP | 2005174120 A | 6/2005 |
| JP | 2005267535 A | 9/2005 |
| JP | 3762882 B2 | 4/2006 |
| JP | 2006216073 A | 8/2006 |
| JP | 2006260329 A | 9/2006 |
| JP | 2007042127 A | 2/2007 |
| JP | 2008027265 A | 2/2008 |
| JP | 2009020845 A | 1/2009 |
| JP | 2009518761 A | 5/2009 |
| JP | 2009301480 A | 12/2009 |
| JP | 4485548 B2 | 6/2010 |
| JP | 2010152588 A | 7/2010 |
| JP | 2011002905 A | 1/2011 |
| JP | 4669373 B2 | 4/2011 |
| JP | 4669430 B2 | 4/2011 |
| JP | 5952307 B2 | 7/2016 |
| JP | 5952312 B2 | 7/2016 |
| JP | 6138054 B2 | 6/2017 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO20030081441 | 10/2003 |
| WO | WO2007068123 A1 | 6/2007 |
| WO | WO20070118424 A1 | 10/2007 |
| WO | WO2010062540 A1 | 6/2010 |
| WO | WO2010062542 A1 | 6/2010 |
| WO | WO2012101240 A1 | 8/2012 |
| WO | WO2012101243 A1 | 8/2012 |
| WO | WO2012113791 A1 | 8/2012 |
| WO | WO2013144358 A2 | 10/2013 |
| WO | WO2013167734 A1 | 11/2013 |
| WO | WO2014041148 A1 | 3/2014 |
| WO | WO2014041149 A1 | 3/2014 |

OTHER PUBLICATIONS

"Web analytics," Wikipedia [online], Jan. 27, 2001 [retrieved on Sep. 11, 2017], Retrieved from the Internet: <URL: https://en.wikipedia.org/w/index.php?title=Web_analytics&oldid=410384013>, 11 pages.
"Examining Division Preliminary Opinion," European Patent Application No. 12703483.3, dated Apr. 30, 2018, 9 pages.
"The GNU Make Manual", Version 3.79, edition 0.55, Apr. 2000, Free Software Foundation, Inc, pp. 1-8, 118, 128.
Rational Software Corporation, "Introduction to ClearCase", Dec. 1999, Rational ClearCase, Release 4.0, pp. i-xiv, 1, 2, 30, 33, 37, 40, 59.
Rational Software Corporation, "Administering ClearCase", Rational ClearCase Release 4.0, 1999, pp. i-xxx, 1-6, 129-162, 255-260, 278, 281, 283, 345-348.
Challenger et al., "A Scalable System for Consistently Caching Dynamic Web Data", Infocom '99. Eighteenth Annual Joint Conference of the IEEE Computer and Communications Societies. Proceedings. IEEE, Mar. 21-25, 1999, pp. 294-303, vol. 1, 10 pages.
Challenger et al., "A Publishing System for Efficiently Creating Dynamic Web Content", Infocom 2000. Nineteenth Annual Joint Conference of the IEEE Computer and Communications Societies. Proceedings. IEEE, Mar. 26-30, 2000, vol. 2, pp. 1-7, 10.
Croll et al., "Content Management—The Users Requirements", International Broadcasting Convention, Conference Publication No. 447, Sep. 12-16, 1997, 4 pages.
Idiom, Inc. "WorldServer 2 White Paper", 2000, 19 pages.
Market Wire. "VerticalNet Selects Uniscape as Globalization Provider to Speed Global Expansion", Jun. 2000, <www.findarticles.com/p/articles/mi_pwwi/is_200006/ai_mark01011558/print> accessed on Oct. 1, 2005, 2 pages.
PRNewsWire and News desk. "Personify Selects Uniscape to Enable Ebusiness Solutions for Global Markets", Aug. 30, 2000, <www.findwealth.com/personify-selects-uniscape-to-enable-180593pr.html> accessed on Oct. 1, 2005, 2 pages.
Uniscape, Inc. "Uniscape, Inc. Home Page", publicly posted Feb. 20, 1999, <web.archive.org/web/19990220195249//http://www.uniscape-inc.com/> accessed on Oct. 1, 2005, 2 pages.
Business Wire. "Uniscape Introduces Pilot Program to Provide Multilingual Website Management Solutions," Feb. 11, 1999, <www.findarticles.com/p/articles/mi_m0EIN/is_1999_Feb_11/11/ai_53852378> accessed on May 9, 2011, 1 page.
Business Wire. "Uniscape Announces New Solution for Automating Management of Software Localization Process," Aug. 17, 1998, <www.findarticles.com/p/articles/mi_m0EIN/is_1998_August_17/ai_21090247> accessed on Sep. 30, 2005, 2 pages.
Market Wire. "Cephren Relies on Uniscape During Rapid Global eBusiness Expansion," Oct. 18, 2000, <www.marketwire.com/mw/iwpr?id=18115&cat=te> accessed on Oct. 1, 2005, 2 pages.
My Yahoo—RSS Headlines Module—Frequently Asked Questions. XP002508567. Dec. 17, 2008.
"Krishnan, ""Unmittelbare Ergebnisse Noch Schneller: Google Vorschau—Der Google Produkt-Kompass,""Nov. 9, 2010, <http://web.archive.org/web/20101109154340/http://google-produkt-kompass.blogspot.com/2010/11/unmittelbare-ergebnisse-nochschneller.html> accessed on Apr. 4, 2012, 2 pages."
Unidex, Inc.: "XML Convert," Aug. 4, 2007, <http://www.unidex.com/xflat.htm> accessed on Apr. 5, 2012, 1 page.
Wikipedia—"SOAP," Jan. 22, 2011, <http://en.wikipedia.org/w/index.php?title=SOAP&oldid=409349976> accessed on Apr. 4, 2012, 5 pages.
Mutz et al., "User-Agent Display Attributes," HTTP Working Group, Nov. 26, 1996, 6 pages.
XP007905525, The Technical Aspects Identified in the Present Application (Art. 15 PCT) are considered part of common general knowledge. Due to their notoriety no documentary evidence is found to be required. Official Journal Nov. 2007, p. 592.
International Search Report and Written Opinion dated Apr. 26, 2012 in application No. PCT/EP2012/051284, filed Jan. 27, 2012.
International Search Report and Written Opinion dated May 15, 2012 in application No. PCT/EP2012/052934, filed Feb. 21, 2012.
International Search Report and Written Opinion dated May 2, 2012 in application No. PCT/EP2012/051291, filed Jan. 27, 2012.
International Search Report and Written Opinion dated Oct. 23, 2013 in Patent Cooperation Treaty application No. PCT/EP2013/056842, filed Mar. 29, 2013 pp. 1, 3-6, 8-10.
International Search Report and Written Opinion dated Jan. 8, 2014 in Patent Cooperation Treaty application No. PCT/EP2013/069078, filed Sep. 14, 2013 pp. 1, 3-7.
International Search Report and Written Opinion dated Jan. 8, 2014 in Patent Cooperation Treaty application No. PCT/EP2013/069077, filed Sep. 14, 2013 pp. 1, 3, 4, 6-8.
Colligan et al.; Special Edition Using Microsoft Office FrontPage 2003; 2004; Que Publishing; pp. 50-91 and 323-326.
"Highlight;" Microsoft Computer Dictionary; May 1, 2002; Microsoft Press; p. 320.
First Examination Report dated Jun. 17, 2014 in European Patent Convention application No. 12707723.8, filed Feb. 21, 2012, pp. 1, 3-6.
Summons to Attend Oral Proceedings dated Feb. 11, 2015 in European Patent Convention application No. 12707723.8, filed Feb. 21, 2012, pp. 1-7.
"Inheritance (object-oriented programming)", archived Wikipedia on Sep. 4, 2011, http://en.wikipedia.org/w/index.php?title=Iheritance_(object-oriented_programming)&oldid=448382925, pp. 1-7.

(56) References Cited

OTHER PUBLICATIONS

Result of Consultation mailed May 28, 2015 in European Patent Convention application No. 12707723.8, filed Feb. 21, 2012, pp. 1-3.
Decision to Refuse dated Jun. 29, 2015 in European Patent Application 12707723.8 filed Feb. 21, 2012, pp. 1-30.
The Minutes of Oral Proceeding mailed Jun. 29, 2015 in European Patent Application 12707723.8 filed Feb. 21, 2012, pp. 1-8.
Preview; Feb. 26, 2011; Dictionary.com; pp. 1-2.
Edgar; "Why Do Browsers Display My Site Differently?" Jun. 3, 2009 (updated Nov. 2010); matthewedgar.net; pp. 1-5.
Office Action dated Jan. 5, 2016 in Japanese Patent Application 2013-550887 filed Jan. 27, 2012, pp. 1-20.
Office Action dated Dec. 22, 2015 in Japanese Patent Application 2013-550888 filed Jan. 27, 2012, pp. 1-20.
Office Action dated Feb. 9, 2016 in Japanese Patent Application 2013-554869 filed Feb. 21, 2012, pp. 1-4.
Notice of Allowance dated May 24, 2016 in Japanese Patent Application 2013-550888 filed Jan. 27, 2012, pp. 1-3.
Notice of Allowance dated May 24, 2016 in Japanese Patent Application 2013-554869 filed Feb. 21, 2012, pp. 1-3.
Japan Patent Application No. 2013-550887, "Office Action," dated Oct. 4, 2016, 4 pages [8 pages including translation].
European Patent Application No. 12703482.5, "Office Action," dated Sep. 6, 2016, 4 pages.
Wikipedia; "Serialization"; Nov. 14, 2013; 10 pages; https://web.archive.org/web/20131114152415/http://en.wikipedia.org/wiki/Serialization.
Microsoft, MSDN; "Serialization .NET Framework 4.5"; Jan. 10, 2013; 2 pages; https://web.archive.org/web/20130110102559/http://msdn.microsoft.com/en-us/library/7ay27kt9(v=vs.110).aspx.
European Patent Application No. 12703483.3, "Office Action," dated Jan. 25, 2017, 7 pages.
"Notice of Allowance," Japan Patent Application No. 2013-550887, dated Apr. 11, 2017, 3 pages.
Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.
Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.
Callison-Burch et al. "Proceedings of the Seventh Workshop on Statistical Machine Translation" [W12-3100] Proceedings of the Seventh Workshop on Statistical Machine Translation, Jun. 7, 2012, pp. 10-51. Retrieved from: http://aclanthology.info/volumes/proceedings-of-the-seventh-workshop-onstatistical-machine-translation.
Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation.
Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.
Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.
Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.
Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.
Hardmeier et al. "Tree Kernels for Machine Translation Quality Estimation" [W12-3112] Proceedings of the Seventh Workshop on Statistical Machine Translation,Jun. 7, 2012, pp. 109-113. Retrieved from: http://aclanthology.info/volumes/proceedings-of-the-seventh-workshop-onstatistical-machine-translation.
Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from: http://aclanthology.info/volumes/proceedings-of-the-seventh-workshop-onstatistical-machine-translation.
Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.
Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.
Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.
Rubino et al. "DCU—Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.
Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.
Wu et al. "Regression with Phrase Indicators for Estimating MT Quality" [W12-3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.
Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.
"Best Practices—Knowledge Base," Lilt website [online], Mar. 6, 2017 [retrieved on Oct. 19, 2017], Retrieved from the Internet:<https://lilt.com/kb/translators/best-practices>, 2 pages.
"Data Security—Knowledge Base," Lilt website [online], Oct. 14, 2016 [retrieved on Oct. 19, 2017], Retrieved from the Internet:<https://lilt.com/kb/security>, 1 pages.
"Data Security and Confidentiality," Lilt website [online], 2017 [retrieved on Oct. 19, 2017], Retrieved from the Internet:<https://lilt.com/security>, 7 pages.
"Memories—Knowledge Base," Lilt website [online], Jun. 7, 2017 [retrieved on Oct. 19, 2017], Retrieved from the Internet:<https://lilt.com/kb/project-managers/memory>, 4 pages.
"Memories (API)—Knowledge Base," Lilt website [online], Jun. 2, 2017 [retrieved on Oct. 19, 2017], Retrieved from the Internet:<https://lilt.com/kb/api/memories>, 1 page.

(56) References Cited

OTHER PUBLICATIONS

"Quoting—Knowledge Base," Lilt website [online], Jun. 7, 2017 [retrieved on Oct. 19, 2017], Retrieved from the Internet:<https://lilt.com/kb/project-managers/quoting>, 4 pages.
"The Editor—Knowledge Base," Lilt website [online], Aug. 15, 2017 [retrieved on Oct. 19, 2017], Retrieved from the Internet:<https://lilt.com/kb/translators/editor>, 5 pages.
"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.
"What is Lilt_—Knowledge Base," Lilt website [online],Dec. 15, 2016 [retrieved on Oct. 19, 2017], Retrieved from the Internet:<https://lilt.com/kb/what-is-lilt>, 1 page.
"Getting Started—Knowledge Base," Lilt website [online], Apr. 11, 2017 [retrieved on Oct. 20, 2017], Retrieved from the Internet:<https://lilt.com/kb/translators/getting-started>, 2 pages.
"The Lexicon—Knowledge Base," Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API_API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base," Lilt website [online], Jun. 7, 2017, retrieved on Oct. 20, 2017, Retrieved from the Internet:<https://lilt.com/kb/project-managers/projects>, 3 pages.
"Getting Started with lilt," Lilt website [online], May 30, 2017, retrieved on Oct. 20, 2017, Retrieved from the Internet:<https://lilt.com/kb/api/lilt-js>, 6 pages.
"Interactive Translation—Knowledge Base," Lilt website [online], Aug. 17, 2017, retrieved on Oct. 20, 2017, Retrieved from the Internet:<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models Fromwebdata Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http:ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.
Potet et al., "Preliminary Experiments on Using Users' Post-Editions to Enhance a SMT System," Proceedings of the European Association for Machine Translation (EAMT), May 2011, pp. 161-168. Retreived from Retrieved at http://www.mt-archive.info/EAMT-2011-Potet.pdf.
Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.
Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.
Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.
Levenberg et al."Stream-based Translation Models for Statistical Machine Translation" Human Language Technologies: The 2010 Annual Conference of the North American Chapter of the ACL, Dec. 31, 2010, pp. 394-402.
Lagarda et al. "Statistical Post-Editing of a Rule Based Machine Translation System" Proceedings of NAACL HLT 2009: Short Papers, Jun. 2009, pp. 217-220.
Ehara, "Rule Based Machine Translation Combined with Statistical Post Editor for Japanese to English Patent Translation," MT Summit XI, 2007, pp. 13-18.
Bechara et al. "Statistical Post-Editing for a Statistical MT System" Proceedings of the 13th Machine Translation Summit, 2011, pp. 308-315.
Non-Final Office Action, dated Jan. 17, 2013, U.S. Appl. No. 13/016,989, filed Jan. 29, 2011.
Non-Final Office Action, dated Nov. 19, 2013, U.S. Appl. No. 13/016,989, filed Jan. 29, 2011.
Final Office Action, dated Jul. 1, 2014, U.S. Appl. No. 13/016,989, filed Jan. 29, 2011.
Non-Final Office Action, dated Mar. 2, 2015, U.S. Appl. No. 13/016,989, filed Jan. 29, 2011.
Final Office Action, dated Sep. 23, 2015, U.S. Appl. No. 13/016,989, filed Jan. 29, 2011.
Advisory Action, dated Feb. 9, 2016, U.S. Appl. No. 13/016,989, filed Jan. 29, 2011.
Non-Final Office Action, dated Sep. 28, 2016, U.S. Appl. No. 13/016,989, filed Jan. 29, 2011.
Non-Final Office Action, dated May 23, 2013, U.S. Appl. No. 13/035,852, filed Feb. 25, 2011.
Final Office Action, dated Feb. 3, 2014, U.S. Appl. No. 13/035,852, filed Feb. 25, 2011.
Advisory Action, dated Apr. 16, 2014, U.S. Appl. No. 13/035,852, filed Feb. 25, 2011.
Non-Final Office Action, dated Mar. 10, 2016, U.S. Appl. No. 13/035,852, filed Feb. 25, 2011.
Final Office Action, dated Oct. 6, 2016, U.S. Appl. No. 13/035,852, filed Feb. 25, 2011.
Advisory Action, dated Nov. 29, 2016, U.S. Appl. No. 13/035,852, filed Feb. 25, 2011.
Final Office Action, dated Jun. 14, 2013, U.S. Appl. No. 13/016,988, filed Jan. 29, 2011.
Non-Final Office Action, dated Nov. 26, 2012, U.S. Appl. No. 13/016,988, filed Jan. 29, 2011.
Non-Final Office Action, dated Sep. 11, 2014, U.S. Appl. No. 13/016,988, filed Jan. 29, 2011.
Final Office Action, dated Apr. 6, 2015, U.S. Appl. No. 13/016,988, filed Jan. 29, 2011.
Non-Final Office Action, dated May 11, 2016, U.S. Appl. No. 13/016,988, filed Jan. 29, 2011.
Notice of Allowance, dated Aug. 24, 2016, U.S. Appl. No. 13/016,988, filed Jan. 29, 2011.
Notice of Allowance, dated Jun. 13, 2012, U.S. Appl. No. 13/019,980, filed Feb. 2, 2011.
Non-Final Office Action, dated Aug. 19, 2011, U.S. Appl. No. 13/019,980, filed Feb. 2, 2011.
Notice of Allowance, dated Oct. 28, 2010, U.S. Appl. No. 10/003,315, filed Dec. 6, 2001.

(56) References Cited

OTHER PUBLICATIONS

Non-Final Office Action, dated Apr. 20, 2010, U.S. Appl. No. 10/003,315, filed Dec. 6, 2001.
Final Office Action, dated Apr. 17, 2008, U.S. Appl. No. 10/003,315, filed Dec. 6, 2001.
Non-Final Office Action, dated Jul. 23, 2007, U.S. Appl. No. 10/003,315, filed Dec. 6, 2001.
Final Office Action, dated Jun. 1, 2006, U.S. Appl. No. 10/003,315, filed Dec. 6, 2001.
Non-Final Office Action, dated Oct. 11, 2005, U.S. Appl. No. 10/003,315, filed Dec. 6, 2001.
Notice of Allowance, dated Jan. 30, 2008, U.S. Appl. No. 09/665,241, filed Sep. 18, 2000.
Final Office Action, dated Jul. 24, 2007, U.S. Appl. No. 09/665,241, filed Sep. 18, 2000.
Non-Final Office Action, dated Oct. 20, 2006, U.S. Appl. No. 09/665,241, filed Sep. 18, 2000.
Advisory Action, dated Jun. 12, 2006, U.S. Appl. No. 09/665,241, filed Sep. 18, 2000.
Final Office Action, dated Mar. 14, 2006, U.S. Appl. No. 09/665,241, filed Sep. 18, 2000.
Non-Final Office Action, dated Dec. 1, 2005, U.S. Appl. No. 09/665,241, filed Sep. 18, 2000.
Non-Final Office Action, dated Jun. 3, 2005, U.S. Appl. No. 09/665,241, filed Sep. 18, 2000.
Final Office Action, dated Sep. 10, 2004, U.S. Appl. No. 09/665,241, filed Sep. 18, 2000.
Non-Final Office Action, dated Nov. 26, 2003, U.S. Appl. No. 09/665,241, filed Sep. 18, 2000.
Non-Final Office Action, dated May 9, 2014, U.S. Appl. No. 13/436,656, filed Mar. 30, 2012.
Final Office Action, dated Dec. 4, 2014, U.S. Appl. No. 13/436,656, filed Mar. 30, 2012.
Non-Final Office Action, dated Jun. 8, 2015, U.S. Appl. No. 13/436,656, filed Mar. 30, 2012.
Final Office Action, dated Jan. 7, 2016, U.S. Appl. No. 13/436,656, filed Mar. 30, 2012.
Advisory Action, dated Mar. 8, 2016, U.S. Appl. No. 13/436,656, filed Mar. 30, 2012.
Notice of Allowance, dated May 4, 2016, U.S. Appl. No. 13/436,656, filed Mar. 30, 2012.
Non-Final Office Action, dated Nov. 28, 2016, U.S. Appl. No. 13/891,029, filed May 9, 2013.
Non-Final Office Action, dated May 6, 2014, U.S. Appl. No. 13/609,293, filed Sep. 11, 2012.
Final Office Action, dated Mar. 18, 2015, U.S. Appl. No. 13/609,293, filed Sep. 11, 2012.
Advisory Action, dated Jun. 29, 2015, U.S. Appl. No. 13/609,293, filed Sep. 11, 2012.
Non-Final Office Action, dated May 3, 2016, U.S. Appl. No. 13/609,293, filed Sep. 11, 2012.
Notice of Allowance, dated Nov. 7, 2016, U.S. Appl. No. 13/609,293, filed Sep. 11, 2012.
Non-Final Office Action, dated Feb. 26, 2015, U.S. Appl. No. 13/886,194, filed May 2, 2013.
Non-Final Office Action, dated Dec. 14, 2015, U.S. Appl. No. 13/886,194, filed May 2, 2013.
Final Office Action, dated Jul. 12, 2016, U.S. Appl. No. 13/886,194, filed May 2, 2013.
Final Office Action, dated Oct. 31, 2016, U.S. Appl. No. 13/886,194, filed May 2, 2013.
Non-Final Office Action, dated May 19, 2015, U.S. Appl. No. 13/886,199, filed May 2, 2013.
Final Office Action, dated Jan. 19, 2016, U.S. Appl. No. 13/886,199, filed May 2, 2013.
Non-Final Office Action, dated Sep. 29, 2015, U.S. Appl. No. 14/023,384, filed Sep. 10, 2013.
Final Office Action, dated May 3, 2016, U.S. Appl. No. 14/023,384, filed Sep. 10, 2013.
Non-Final Office Action, dated Nov. 28, 2016, U.S. Appl. No. 14/023,384, filed Sep. 10, 2013.
Non-Final Office Action, dated Oct. 30, 2015, U.S. Appl. No. 14/091,329, filed Nov. 26, 2013.
Final Office Action, dated Jun. 14, 2016, U.S. Appl. No. 14/091,329, filed Nov. 26, 2013.
Advisory Action, dated Sep. 8, 2016, U.S. Appl. No. 14/091,329, filed Nov. 26, 2013.
Non-Final Office Action, dated Jul. 14, 2016, U.S. Appl. No. 14/093,015, filed Nov. 28, 2013.
Final Office Action, dated Nov. 3, 2016, U.S. Appl. No. 14/093,015, filed Nov. 28, 2013.
Final Office Action, dated Apr. 20, 2017, U.S. Appl. No. 13/016,989, filed Jan. 29, 2011.
Advisory Action, dated Apr. 28, 2017, U.S. Appl. No. 13/886,194, filed May 2, 2013.
Notice of Allowance, dated May 9, 2017, U.S. Appl. No. 13/891,029, filed May 9, 2013.
Notice of Allowance, dated Jun. 14, 2017, U.S. Appl. No. 14/023,384, filed Sep. 10, 2013.
Non-Final Office Action, dated Jun. 15, 2017, U.S. Appl. No. 13/035,852, filed Feb. 25, 2011.
Advisory Action, dated Jun. 23, 2017, U.S. Appl. No. 13/886,194, filed May 2, 2013.
Non-Final Office Action, dated Jul. 11, 2017, U.S. Appl. No. 15/423,305, filed Feb. 2, 2017.
Schafer, Ben J. et al., "Recommender Systems in E-Commerce," Proceedings of the 1st ACM conference on Electronic Commerce (EC '99), ACM, New York, NY, 1999, pp. 158-166.
"Decision to Refuse," European Patent Application No. 12703483.3, dated Jun. 19, 2018, 24 pages.
"Minutes of Oral Proceeding", European Patent Application No. 12703483.3, Jun. 19, 2018, 4 pages.
"Summons to Attend Oral Proceedings," European Patent Application No. 12703482.5, Feb. 14, 2018, 10 pages.
"Office Action," European Patent Application No. 13776975.8, dated Jun. 4, 2018, 11 pages.
"Decision to Refuse," European Patent Application No. 12703482.5, dated Sep. 17, 2018, 4 pages.
Leblond, Dominique, "Blueprinting of Multimedia Assets", U.S. Appl. No. 13/619,591, filed Sep. 14, 2012, 40 pages.
"Summons to Attend Oral Proceedings," European Patent Application No. 13776975.8, Jul. 2, 2019, 18 pages.
Eckerson, Wayne, "Performance Management Strategies: How to Create and Deploy Effective Metrics," TDWI Best Practices Report, First Quarter (2009), 35 pages.
Padmanabhan et al., "Using Predictive Prefetching to Improve World Wide Web Latency," ACM Sigcomm Computer Communication Review 26.3, 1996, pp. 22-36.
Hasegawa et al., "Multilingual Disaster Information System: Information Delivery Using Graphic Text for Mobile Phones," AI & Soc 19, 2005, pp. 265-278.

* cited by examiner

FIG. 6

TRANSLATION REVIEW WORKFLOW SYSTEMS AND METHODS

CROSS REFERENCE TO RELATED APPLICATIONS

This application claims the benefit and priority of U.S. Provisional Application Ser. No. 62/249,027, entitled "Translation Review Workflow Systems and Methods," filed on Oct. 30, 2015, which is hereby incorporated by reference herein in its entirety, including all references and appendices cited therein.

FIELD OF THE PRESENT DISCLOSURE

The present disclosure relates generally to translation workflow, and more specifically, but not by limitation, to systems and methods that integrate translation review and workflow within content management systems.

SUMMARY

According to some embodiments, the present disclosure is directed to a system, comprising: (a) a web content management system comprising a translation preview agent, the web content management system managing web content for publishing; (b) a translation system that manages translation content of the web content; and (c) a translation preview service that generates a translation preview of the web content with the translated content that is embedded within the web content to maintain context for a translator.

According to some embodiments, the present disclosure is directed to a method, comprising: (a) authenticating a web content management system that manages web content for publishing; (b) transmitting a translation preview agent to the web content management system after authenticating; (c) receiving a request for a translation preview from a translation system that manages translation content of the web content; and (d) generating, by a cloud-based translation preview service, the translation preview of the web content with the translated content that is embedded within the web content to maintain context for a translator.

According to some embodiments, the present disclosure is directed to a method, comprising: (a) generating a translation preview of linguistic translations for web content in such a way that the linguistic translations are displayed in context within the web content, wherein the web content is secured behind a security firewall of a web content management system; and (b) transmitting the translation preview to a translator.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 6 illustrates an example GUI that includes translation segments for a translation project.

DETAILED DESCRIPTION OF EXAMPLE EMBODIMENTS

Figure 1:
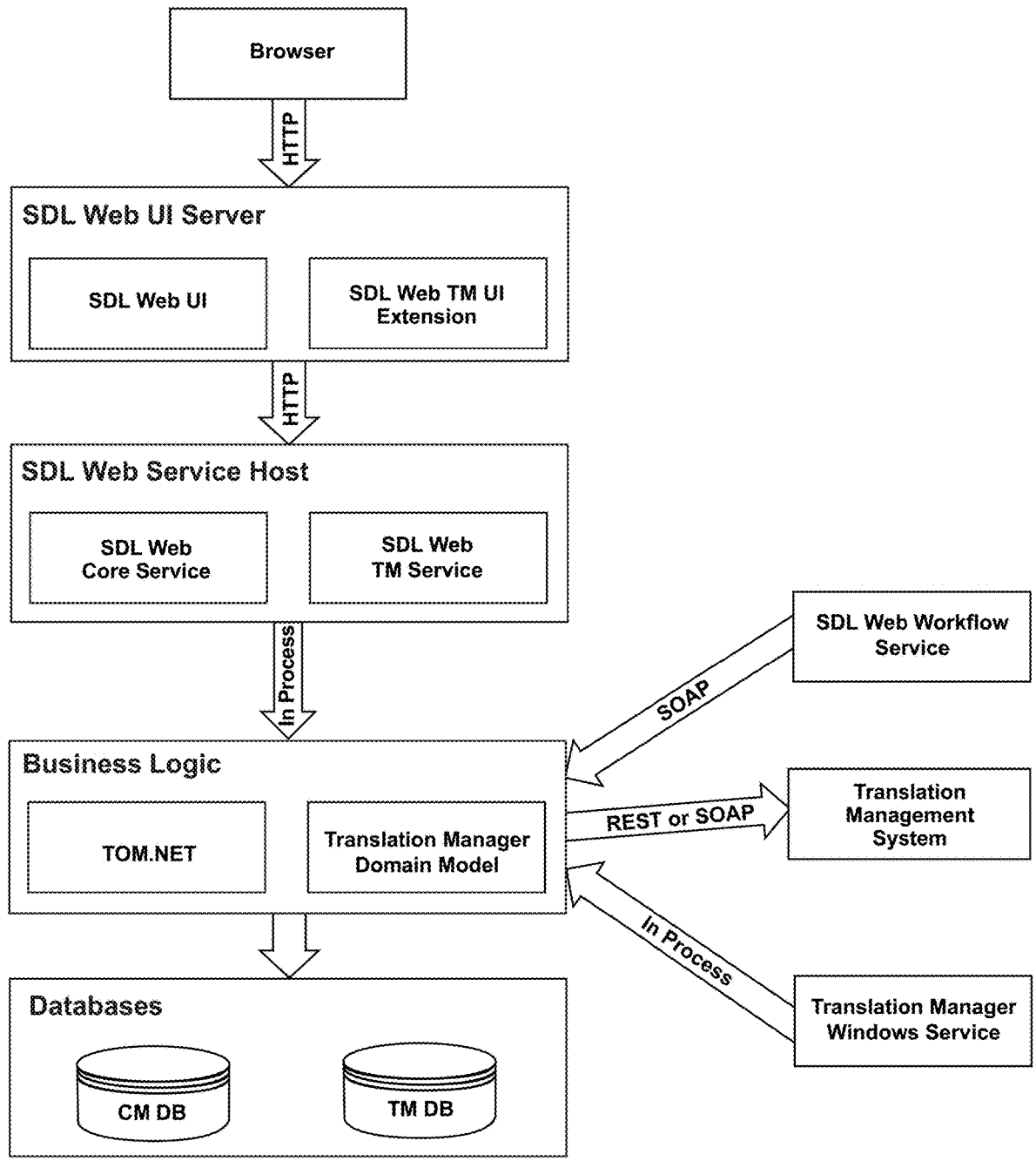
FIG. 1 is a schematic diagram of an example system for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

In general, the present disclosure provides an integration of translation workflow within web content management systems. More specifically, the present disclosure provides for integration of a web content management system and a translation management system, allowing translation reviews to be performed within the translation management system as an integrated part of a translation workflow controlled by a translation management system.

In one embodiment, the present disclosure comprises an architecture that includes one or more web content management systems that allow a user to create a portfolio of web content assets, such as web pages, advertising content, and so forth. To be sure, these systems can be used to create web content that is distributed in numerous languages. Thus, translation of content within web content portfolios or campaigns is often required. For example, a web page created in English may have textual components that require translation into French if the web page is to be published to French speaking users.

Rather than pushing content translation requests to a translation system and integrating the translations back into the web content campaigns by users, the present disclosure provides an integration of translation workflow editing and review within the web content management system, through the use of a translation preview service. The web content author or user can directly request, review, and approve translation requests that are processed by the translation system from within a web content management interface that is linked to the translation preview service. That is, the same web content management interface that allows the user to create a web content asset is integrated with translation workflow functionality.

The web content management system may communicatively couple with the translation systems via a public or private network. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

The systems described herein generally comprise a processor, one or more network interface, and memory. According to some embodiments, the memory comprises logic (e.g., instructions) that can be executed by the processor to perform various methods.

In one embodiment, the web content management system can utilize a workflow engine that interfaces with the translation system using a translation API (application programming interface). In another embodiment, a cloud-based translation preview service is utilized in conjunction with a translation preview agent that is installed on the web content management system.

The translation system will provide the web content management system with proposed translations that are created using any variety of machine driven translation processes, such as statistical machine translation, translation memory, and so forth. These proposed translations can include errors and therefore require user review. The reviewer can utilize the web content management interface to receive notifications of new translation review requests, approve or deny the proposed translations, and request integration of an approved translation into a web content asset.

In some embodiments, the integrated system allows for translation quality thresholds to be established, such that translations of source texts are not accepted if their re-translations have an accuracy level that is lower than a prior translation of that same source text. Users can be notified of pending or completed translation tasks within the web content management system and, in some instances, the user can directly edit a proposed translation within the web content management interface without requiring the user to request retranslation of the source text by the translation system.

When text is translated, it is done one "segment" at a time. A segment is typically a sentence or a paragraph. The segmentation will be done automatically in the translation process before the content is made available to the translator. Some translation tools allow the translator to redefine the segments as part of the translation process. This is done in order to deal with errors in the segmentation where, for example, a single sentence was wrongly split in two, or in order to combine two source sentences into a single segment to allow the translator to change the order or produce a single sentence in the translation. A translation segment is also referred to as a translation component. That is, the translation component is a part of the web content managed by the web content management system.

When translating or reviewing, the translation management system has a user interface that displays the segments to translate. For each segment the user interface displays the source text, translated (target) text if present, and additional metadata. This metadata can include comments, match results from the translation memory, terminology lookups, and so forth.

The translated target file is generated automatically based on the translations found in the segments. As part of the translation—in some embodiments after the final review—the segments are written to a translation memory to allow reuse of the translation in the future. This implies that any changes made to the generated target files—as opposed to changes made within the segments—may not be preserved in the translation memory. If changes are not preserved in the translation memory they are made manually in every future translation update, which can result in an error-prone and time consuming procedure.

The translation management system processes the files in a translation project, and for each file generates one task per target language. So if three files are uploaded and they should be translated to eight languages, a total of 24 tasks will be generated. Each task follows a translation workflow—typically, this will be the same workflow, but it could be different workflows based on the target language, the file type, or other metadata. The tasks can follow the workflow independently—meaning one task can move to the next step in the workflow before other tasks. The capabilities of the workflow engine (for example, branching along different transitions based on external input or metadata) differ between the translation management systems.

The workflow engine disclosed herein supports one or more items being added to a "workflow process instance". Each workflow process instance follows the activities (similar to a "step" in the translation content manager workflow) defined in a "workflow process definition". The workflow engine supports branching on different paths—either by the user choosing the path or an automatic script making the decision based on metadata on the task. Each item added to the workflow process instance must transition the workflow synchronously. Not all items can be included in a workflow in some instances. In one embodiment, items such as "folders" where the web content manager only stores the latest version cannot be included.

A folder provides a tree structure of the components in the system.

The workflow engine allows an item to reach different "approval states" as it progresses in the workflow. These states can be used to determine which websites the item can be published to. A typical use case is to allow items to be published to an internal staging website early in the workflow, but not allowing it to be published to the public website before it completes the workflow entirely. It is possible to create a more granular approach as well, with multiple staging sites all having different approval state requirements.

In one embodiment, the web content manager stores content in a number of different item types. This document contains an overview of the item types typically used in connection with the translation process.

A publication feature provides a structure of the content in the system. In one embodiment, multiple structures can be defined. For example, one structure for the available layouts in the system (standard website, mobile website), designs (different brand colors, and so forth), and content (enterprise wide content, business unit related content, country related content). It is also used to structure the languages for translation, for example, by having an English source content publication with a German and French child publication. In this case the translation manager will send the content from the English publication and store it in the German and French publications. Multiple levels can be defined, for example, by having a Canadian French publication as a child of the French publication.

A structure group provides a tree structure over the pages in the system. This will typically closely match the path used in the URL of the websites. For example, if the website is serving a page as http://myurl/products/myproduct, the page will often be stored inside a structure group named "products".

A schema is used to define the structure of the content stored in a component. This is done by defining the fields the editor will see. Besides text and number fields, it is possible to define lists of fields as well as nested schemas to produce complex component structures.

A component stores the actual content to be published to the website. This is stored as XML according to the schema the component is based on. Aggregation is used to facilitate efficient translation. When this feature is used, the translatable content from multiple web content manager items are placed in a single file and sent for translation together. This can, for example, be used if there is a large number of structure groups, where only the folder name needs to be translated. Instead of having the translator opening hundreds of files with a single word to translate, the translator can open a single file with hundreds of words.

Example Use Case

In one example, a number of translation reviews can typically take place in a translation process. Grammar, spelling, and/or terminology reviews are often done by linguists working directly within the segmented text in the translation management system. They are expected to be familiar with translation tools, but not necessarily with the web systems.

When translating text, the terminology used in the source text might cover multiple meanings in the target language. This requires the translator (and reviewers) to know which specific meaning was intended by the source text. By way of example, the source text contains the single English word "Time:". This could mean "Time of the day" or "duration". The translator or reviewer looks at the text surrounding the source text for clues to which meaning is correct. In this example they might see "Date:" next to the "Time:" text and conclude that "Time of the day" is the correct meaning.

This part of the review process is referred to as "context" based translation. An enhancement to the context based translation process involves the use of a translation preview service, which is described in greater detail below.

A business review is done by people familiar with the target domain, and typically employed by the organization requesting the translation, not the translation services provider. For example, it can be the Spanish marketing team responsible for the Spanish part of the corporate website, or a German engineer reviewing the technical documentation for a product.

FIG. 1 is an example schematic flow diagram of an example system that provides the aforementioned features. In one embodiment a Browser is used to access the Translation Review feature as an integrated part of the SDL Web user interface.

The SDL Web Server host serves requests from the browser. It comprises at least the following two components: (1) SDL Web UI that provides the user interface for the core SDL Web product, as well as extension points to the UI where products like SDL Translation Manager can insert themselves into the SDL Web UI; and (2) SDL Web TM UI Extension that provides all additional user interface required for SDL Web Translation Manager.

The SDL Web Service Host is a Windows service running on one or more machines. It is called by the SDL Web UI Server using the SOAP protocol and comprises at least the following two components: (1) SDL Web CoreService that exposes select parts of the TOM. NET business logic as a SOAP service; and (2) SDL Web TM Service that exposes select parts of the Translation Manager Domain Model as a SOAP service. A Business Logic service comprises business rules of the SDL Web system. The Business Logic service comprises at least the following two components loaded into the process memory: (1) TOM.NET which contains the business logic of the SDL Web Content Manager; and (2) an event system allowing SDL Web Translation Manager to interact with actions performed on SDL Web data.

A Translation Manager Domain Model contains business logic needed by the SDL Web Translation Manager. This includes functionality like creating/obtaining a list of translation jobs, but also all the functionality needed to communicate with translation management systems like SDL TMS and SDL World Server.

A Translation Manager Windows Service is a Windows service process that loads the Business Logic components mentioned above into memory. The Windows service is responsible for sending items from SDL Web to the translation management system, monitoring the status of the translation, and retrieving translations and storing them back in the SDL Web Content Manager.

The Translation Management System represents SDL WorldServer, SDL TMS, or SDL Language Cloud (at present). Each of these exposes one or more SOAP or REST based API's allowing SDL Web Translation Manager to interact with it.

An SDL Web Workflow Service is a Windows service processing the activities in an SDL Web workflow.

The Databases store the data related to the SDL Web Content Manager (CM DB in FIG. 1) and SDL Web Translation Manager (TM DB). Additional business logic is placed at this level. Oracle and MS SQL can be used to store the data in some embodiments. Note that not all data related to SDL Web Translation Manager is stored in the TM DB. Some data that can be linked to a specific SDL Web item are stored with the SDL Web item in the CM DB as "application data"—a type of metadata associated with the item.

Translation Review Implementation in SDL Web

This section outlines how the components in the architecture overview have been modified to support the translation review functionality. As the translation review functionality is not related to sending items for translation, the first touch point with the review functionality is when an item is retrieved from translation. A review process describes an automated part of a translation review workflow. The "User Experience" section below outlines how the user interacts with the review process.

Figure 2:
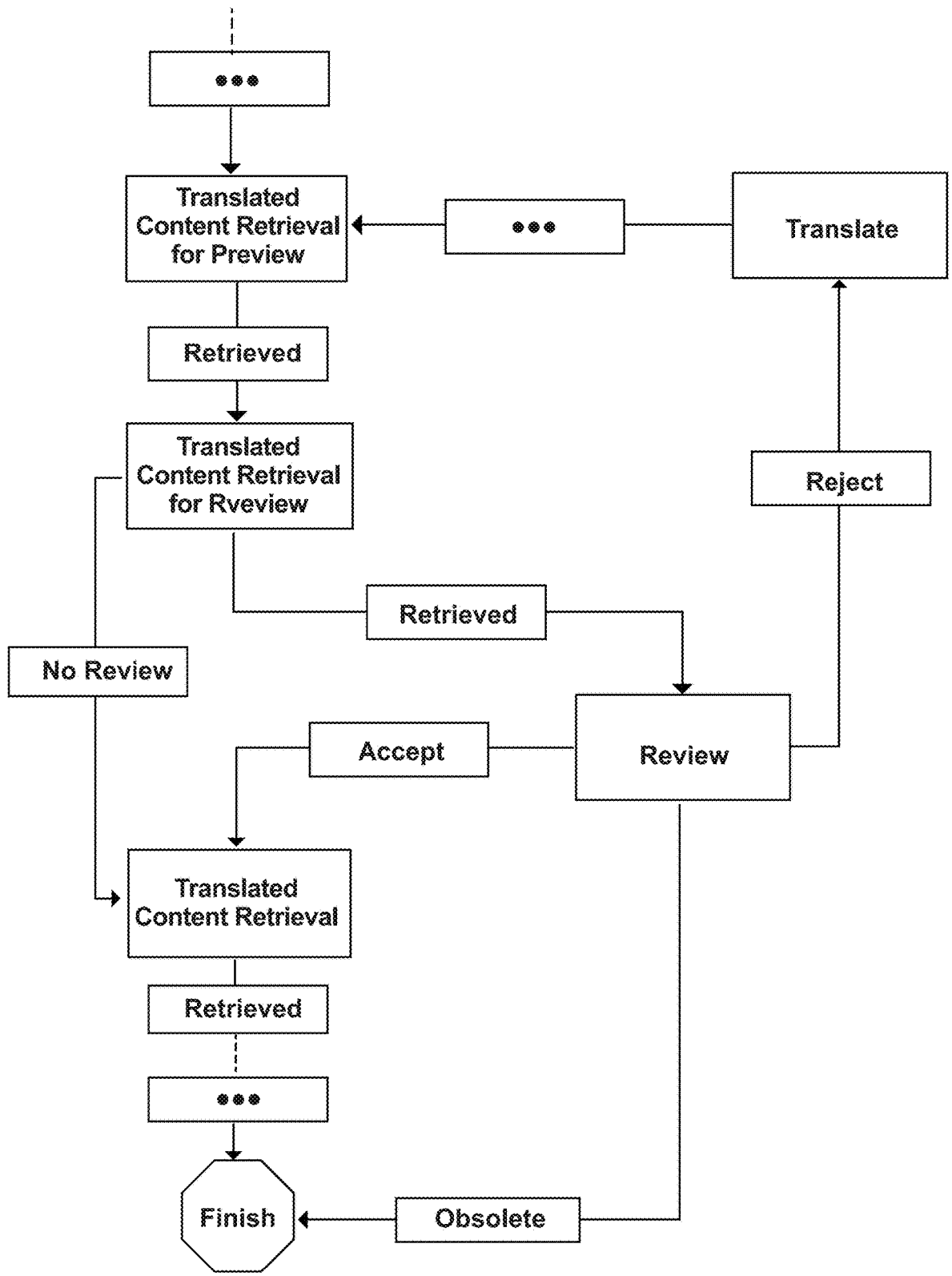
FIG. 2 is a flow diagram of an example method of translation retrieval and review using the system of FIG. 1.

Referring now to FIG. 2, an SDL WorldServer workflow engine offers more complexity than the workflow engine in SDL TMS. So, for the sake of this disclosure, it will be used to describe the review process actions that occur in this translation management system. An SDL TMS workflow will work in a similar fashion, but will only allow moving back to the previous step on rejection of translation and it will not be able to handle the optional obsolete transition.

The start of the workflow is not illustrated, as it does not relate to the review process. It can include steps such as segmenting the content, applying translation memory, and the first translation and linguistic review steps.

A part has also been left out before the finish step, as SDL Web Translation Manager does not interact with an item after it has been through the "Translated Content Retrieval" step. This is typically where translation memories are updated, invoices are sent, and so forth.

An example SDL Web Workflow definition contains decision points and options available to a SDL Web Translation Manager Review workflow. A production workflow will typically contain more activities than this, for example, publishing to a staging website after the PREVIEW or REVIEW activities, and publishing to the public website after the FINAL activity.

Figure 3:
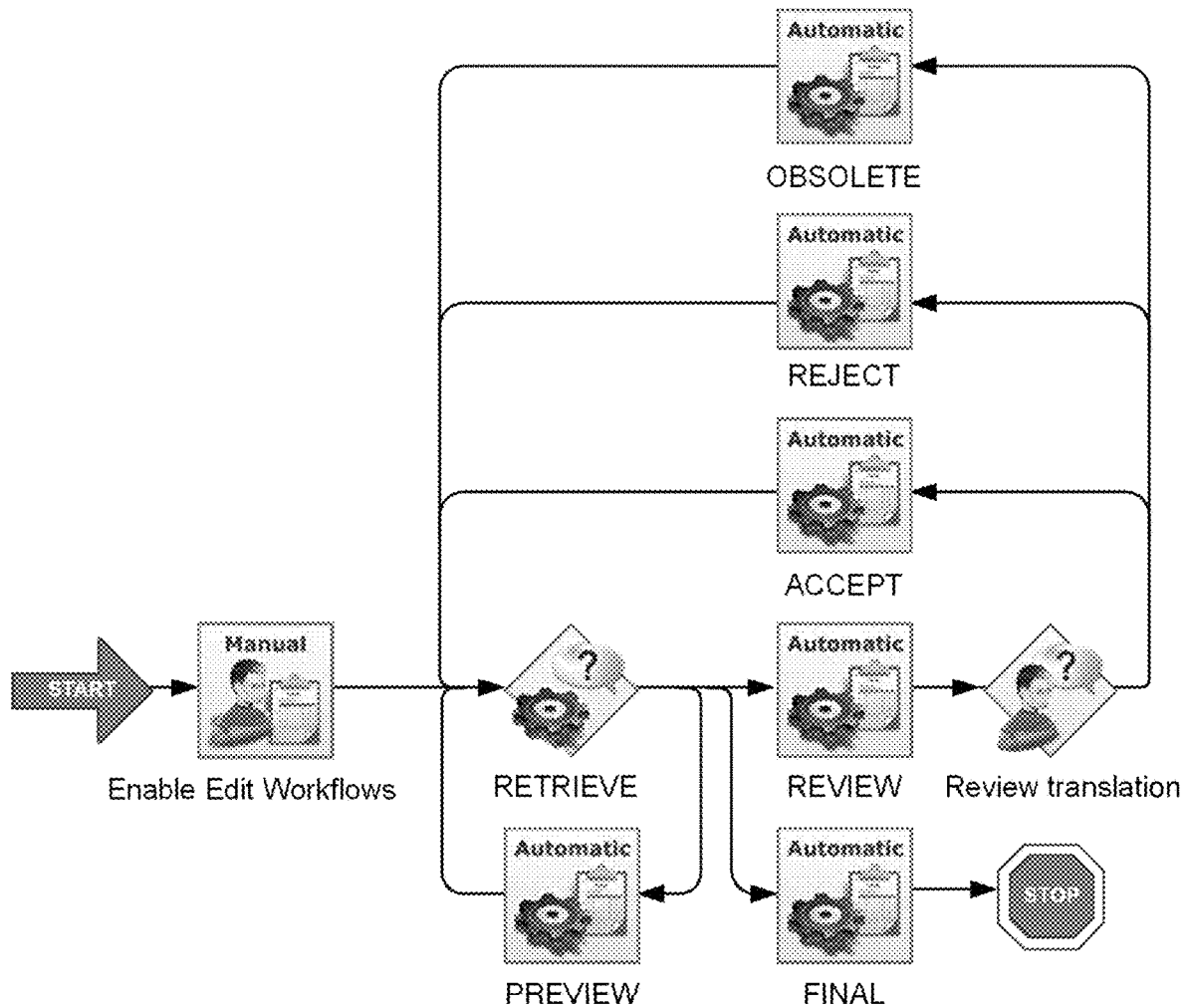
FIG. 3 is a flow diagram of an example translation workflow process.

Referring now to FIG. 3, a workflow has a manual Enable Edit Work step that is not needed if the "Translation review process" is used instead of an edit workflow. All steps except "Enable Edit Workflows" and "Review translations" are "Translation Manager Activity Type" automated steps.

Actions performed by the SDL Web Translation Manager Windows service are also disclosed. For example, when it is detected that a file in translation is in one of the three Translated Content Retrieval (Preview/Review) workflow steps for a target language, it will be retrieved from the translation management system.

If the target item is already in workflow in the SDL Web Content Manager, it will be checked if the item is in the "Retrieve" activity. If it is, it will be retrieved and stored in the SDL Web Content Manager.

If the item is in workflow in the SDL Web Content Manager, but not in the "Retrieve" activity, the item will be transitioned to the "Obsolete" activity if a transition is available from the current activity. If no transition is available, a warning will be logged for the translation job, stating that the retrieval will not take place before the current item is processed in the SDL Web Content Manager workflow. The SDL Web Translation Manager Windows service will keep retrying the retrieval at a configurable interval until the current workflow is finished or has reached the "Retrieve" activity.

If the item is not in workflow in the SDL Web Content Manager the item will be saved directly. If an "Edit workflow" is defined for the item, this workflow will start automatically. The SDL Web Translation Manager Windows service will skip the first activity, and set metadata on the workflow indicating the first retrieval has already occurred. This metadata will be picked up the first time the workflow enters the "Retrieve" activity, allowing it to transition directly to "Preview", "Review", or "Final" as appropriate.

If an "Edit workflow" was not started for the item, the SDL Web Translation Manager Windows service checks if the item has a "Translation review process" workflow designed. If this is the case, a new workflow is created and the item (or items when aggregation is used) will be added to the workflow. As for the "Edit workflow", metadata will be set to allow an automatic transition at the "Retrieve" activity once it is reached. If not all aggregated items can be added to the workflow due to some of the items already being in workflow, a warning will be added to the job, and retrieval will be attempted again after a configurable interval.

Regardless of the method used above, metadata will be set on the workflow process specifying which retrieval method was used (final, review, preview). This metadata can be accessed by automated activities later in the workflow.

The SDL Web Translation Manager Windows service will—besides retrieving the translated file—also retrieve the translation segments from the translation management system. These segments will be stored in the SDL Web Content Manager database as "application data" associated with the individual item.

Actions Performed when Workflow Activities are Completed in SDL Web

The SDL Web Translation Manager includes an event system that monitors workflow activities being completed in the SDL Web Content Manager. If it detects a transition to the "Accept" or "Reject" activities, it will attempt to transition the translation management system workflow for the item along transitions named either "Accept" or "Reject" respectively.

The event system will use the comment of the last "human" activity in the SDL Web Content Manager workflow instance as a comment on the transition in the content management system. This allows comments to flow from the reviewer working in the SDL Web Content Manager to the user in the translation management system.

If the event system succeeds transitioning the translation management system workflow, it will complete the transition of the SDL Web Content Manager workflow. If it fails the transition in the translation management system, it will fail the transition in the SDL Web Content Manager workflow as well. This ensures both the SDL Web Content Manager and the translation management system transitions at the same time, keeping the workflows synchronized.

Actions performed by the SDL Web Workflow agent are also described where the SDL Web Workflow agent is responsible for completing automated activities. As all activities with a script type "Translation Manager Activity" are automated, they are handled by the agent.

All activities besides "Retrieve" and "Preview" activities are completed automatically without any action being performed. This can be done as the activities are responsible for directing the flow of the workflow, not performing a specific action.

The SDL Web Workflow agent regularly checks if metadata on the workflow process instance indicates new content has been retrieved. If this is the case, it will look for a transition to "Review", "Preview", or "Final" depending on the retrieval type, and complete the current activity moving it along the identified transition.

When the Retrieve activity is completed, the comment specified when completing the last "human" step (not a system step) in the translation management system is used as a comment on the completion of the Retrieve activity. This allows comments to be exchanged between the user of the translation management system and the reviewer working in the SDL Web Content Manager.

If the AssignNextActivityTo parameter is specified in the script source, the next activity will be assigned to the specified user once the Review activity finishes. The following users can be specified: (1) Creator—the user originally creating the translation job in the SDL Web Content Manager; (2) LastUser—the user who last modified the translation job in the SDL Web Content Manager (this will typically be the user who specified the job should be send to translation); (3) special considerations—owner users in SDL Web can perform the following administrative functions that can affect the translation review workflow: (a) Rolling back the source item if a source item is rolled back it can result in a source version in the targets that is lower than the version that was translated. This will prevent Translation Manager from storing the new translations. To avoid problems when rolling back: (1) Cancel any running translation job based on source versions that do not exist after the rollback in the translation management system; (2) Rollback any target version as well to the last version translated from a source version that still exists after the rollback (3) Rolling forwards does not require special consideration in relation to the translation review workflow; (4) Force Finish Process while an item is in translation review—if Force Finish Process is done after the RETRIEVE activity has finished retrieving from the "Translated Content Retrieval" translation workflow step, there is no impact in either SDL Web or the Translation Management system—besides the impact that is introduced in SDL Web by not running all activities. It is expected a workflow administrator would understand this.

If Force Finish Process is done before the "Retrieve" activity has finished retrieving from the "Translated Content Retrieval" translation workflow step:
The review version becomes the next major version in SDL Web. In other words the content then becomes the next major version that—was in last review cycle. The user will appreciate that the translation has not gone through the full workflow in the Translation Management system. Therefore the user can —verify the target translation or simply roll back the target item.
Forcing the workflow process to finish, before the "Retrieve" activity has finished retrieving the "Translated Content Retrieval" translation workflow step results in the content becoming a major (new) version of that piece of content in the state it was last in the last Review Cycle (which may not be the state it would be in if retrieval had finished successfully). A user should be aware of these operations within the system and verify the translation or roll back to the original state (last major version) in some embodiments.

The translation management system is likely to be waiting for the SDL Web workflow to transition the item to a new translation workflow step. As the SDL Web workflow is no longer running, this transition must be made manually in the Translation Management system. If the translation management system is transitioned to "Translated Content Retrieval" or "Translated Content Retrieval for Preview" (potentially through other steps), Translation Manager retrieves the item and restarts the workflow.

Revert Process while an item is in translation review—If Revert Process is done after the "Retrieve" activity has finished retrieving from the "Translated Content Retrieval" translation workflow step: (a) the workflow in the translation management system will complete; (b) the translation will not be stored in SDL Web—it will revert to the previous translated version (if any); (c) if a translation is required the item must be sent for translation again; (d) if Revert Process is done before the "Retrieve" activity has finished retrieving from the "Translated Content Retrieval" translation workflow step: (I) the SDL Web workflow will be restarted when the item is retrieved once more from the "Translated Content Retrieval" or "Translated Content Retrieval for Preview" translation workflow steps.

Translation Preview Service

According to some embodiments, the present disclosure provides translation preview features that allow a translator to request a translation preview from a translation preview service. The translation preview comprises a snapshot of an asset, such as a webpage, that requires translation of textual content. Rather than merely requesting that the translator translate textual content without any contextual information, the translation preview allows the translator to see the overall concept of the webpage, such as its domain (subject matter), language, placement, and so forth that allows the translator to translate the textual content in a more efficient and accurate manner.

The translation preview service provides a layer of added security by implementing a translation preview agent on the web content management system when the web content management system is authenticated with a cloud-based translation preview service. The translation preview agent is located behind logical and/or physical security of the web content management system.

Proposed translations of content can be stored at the web content management system. When a translation preview is generated by the translation preview service, the stored translations are integrated into the most current version of the content that includes the translation component(s) that are required for web content that will be published by the web content management system.

Figure 4:
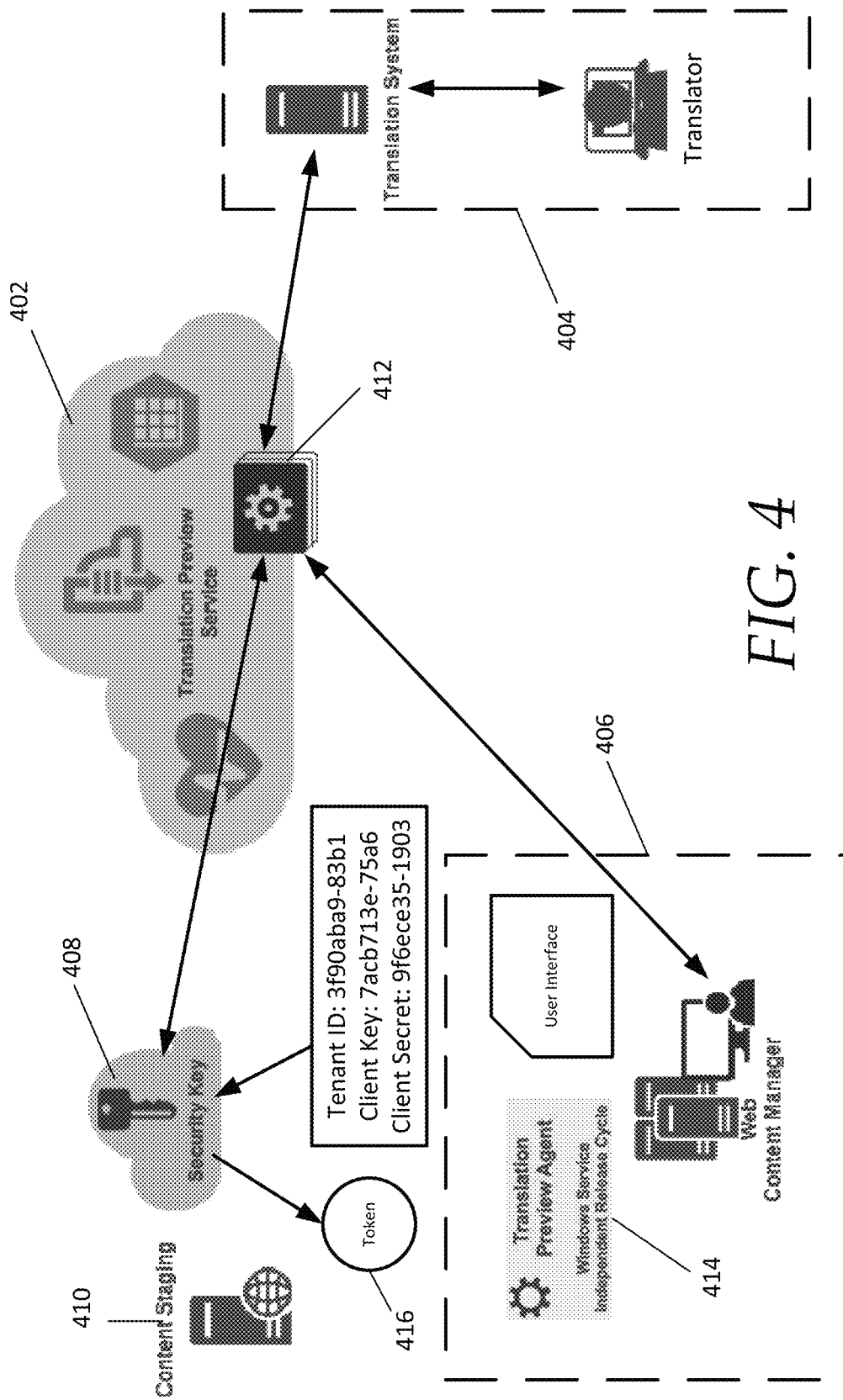
FIG. 4 is a schematic diagram of an example translation preview system.

FIG. 4 is an example system that provides translation previews for translators. The system comprises a translation preview service 402, a translation management system hereinafter "TMS 404" (illustrated as a translation management system 404), a web content management system, hereinafter "WCMS 406" (illustrated as a web content management system 406), a security service 408, and a content staging service 410. Again, this represents an example translation preview system and additional or fewer components may be included in some embodiments.

The translation preview service 402 comprises a cloud-based translation preview component 412. The translation preview component 412 facilitates translation job requests from the web content management system 406 to the translation management system 404, as well as requests for translation previews from the translation management system 404 to the web content management system 406.

Prior to usage of the translation preview component 412, the WCMS 406 is prepared by installing a translation preview agent 414 on the WCMS 406. In one embodiment, a tenant identifier "Tenant ID", client key, and client secret are provided to the security service 408. When the security service 408 authenticates the WCMS 406, the security service 408 returns a token 416 to the WCMS 406.

Figure 5:
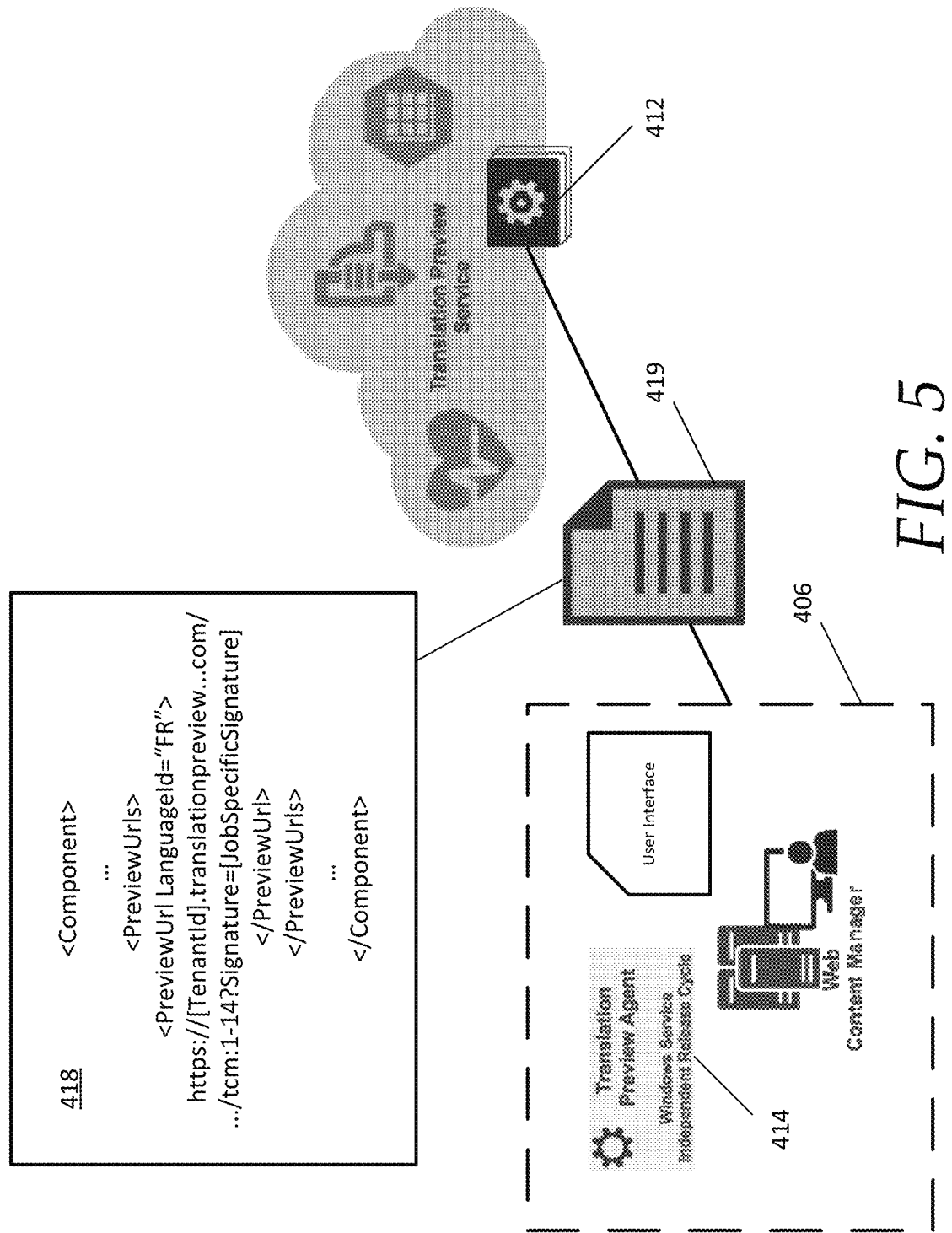
FIG. 5 illustrates a portion of the example translation preview system of FIG. 4, and the use of a translation component script within an HTML document that requires translation.

In some embodiments, the translation preview agent 414 is configured to embed translation components into a translation job request. In some embodiments, as illustrated in FIG. 5, the translation preview agent 414 inserts a component script or content into the web content. For example, if the web content comprises an HTML version of a web page 419, the translation preview agent 414 inserts a component script 418 into the web page. The translation preview agent 414 may insert multiple component scripts into the web page, if multiple translation jobs are required for the webpage. For example, a header and a portion of the body would be two different translation jobs, in some instances.

In one embodiment, the component script 418 comprises code that identifies a preview URL assigned to the web content management system. The preview URL can comprise a subdomain associated with the web content management system. For example, tenantid.translationpreview.com would be a subdomain of the web content management system, where the subdomain prefix is the tenantID described above. A preferred preview language is identified in some embodiments. Multiple preview URLS can be defined in the component script 418. A job specific signature can be used to identify the specific translation job.

Figure 6:
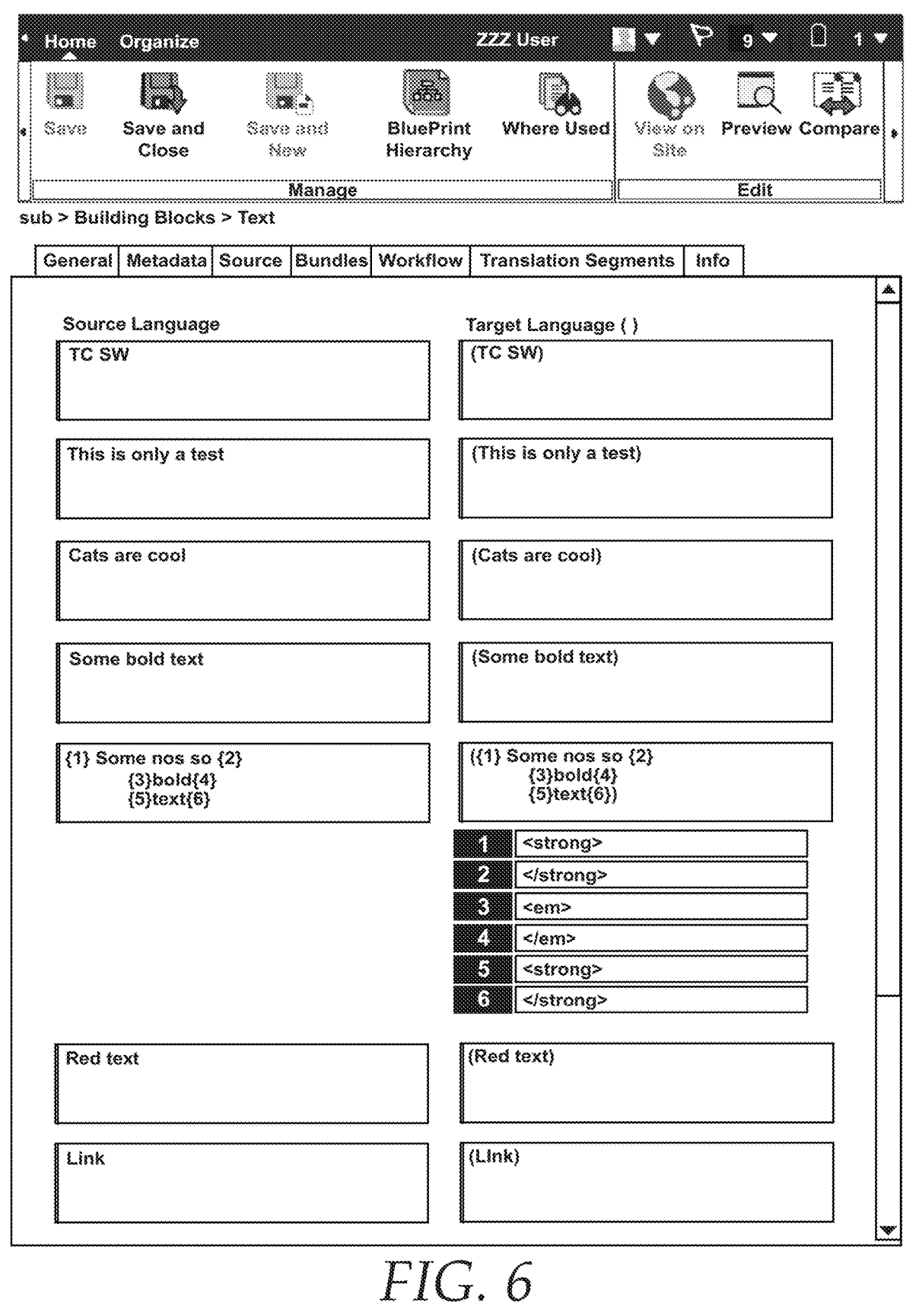

An example element of a translation job is illustrated in FIG. 6 as a segmented view. In some embodiments, a translator will request a translation preview when attempting to complete the example translation job as illustrated in FIG. 6. The translation job comprises translation components (e.g., translation segments) that were determined from the translation request. Translation segments in a source language are displayed on the left, while translated content is displayed on the right, next to corresponding translation segments. The translations can be generated by any human or machine translation process described herein or that would be known to one of ordinary skill in the art.

Figure 7:
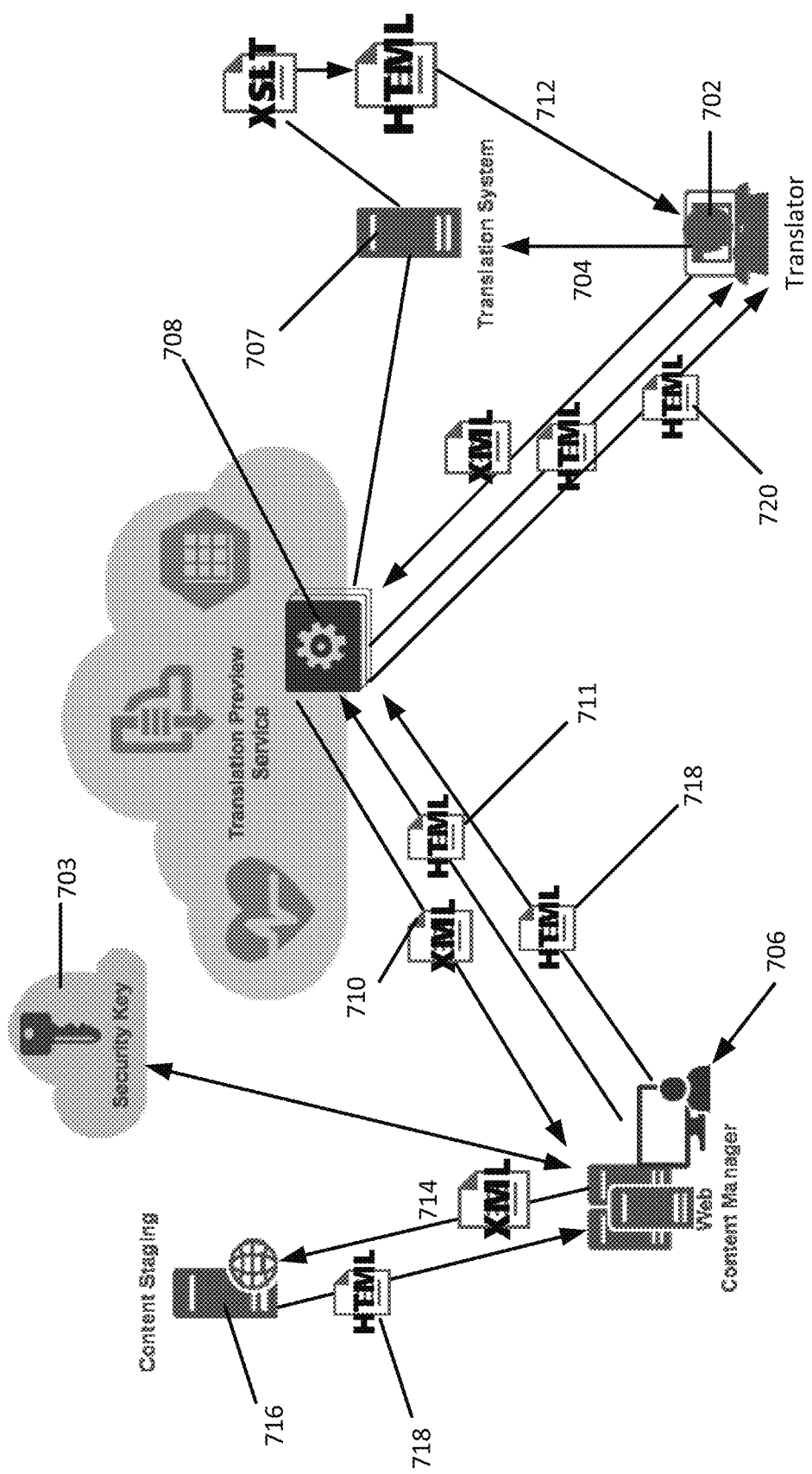
FIG. 7 is a schematic diagram illustrating a flow process for requesting and receiving a translation preview using an example translation preview system.

In FIG. 7 an example process for requesting a translation preview and fulfilling the translation preview request is illustrated. Initially, the process begins with a translator 702 requesting a translation preview of a portion of a translation job. The translator sends a request 704 to the WCMS 706 through the translation preview component 708 within the translation preview cloud service.

The translation request is received by the TMS 710 and an extensible stylesheet language transformations (XSLT) document is generated using the web content and information known about the translation job associated with the web content. The XSLT document is converted to a hypertext markup language (HTML) document and then the HTML document is transmitted back to the translator in step 712.

The translator 702 then transmits the HTML document to the translation preview component 708 as an XML document, though other document formats can be utilized. In step 710, any preview URLs are checked and an authentication step is performed before transmitting the XML document to the WCMS 706. It will be understood that in some embodiments, all authentication keys or identifiers are not stored in the translation preview component 708. In some embodiments, the security service 703 authenticates requests to the WCMS 706 from the translation system (can be either the translator system 702 or the translator of a translator system 707 (e.g., TMS) for the translation preview). Again, in some embodiments, the security service authenticates the web content management system using a tenant identifier, a client key, and a client secret value, or any combinations thereof.

Figure 8:
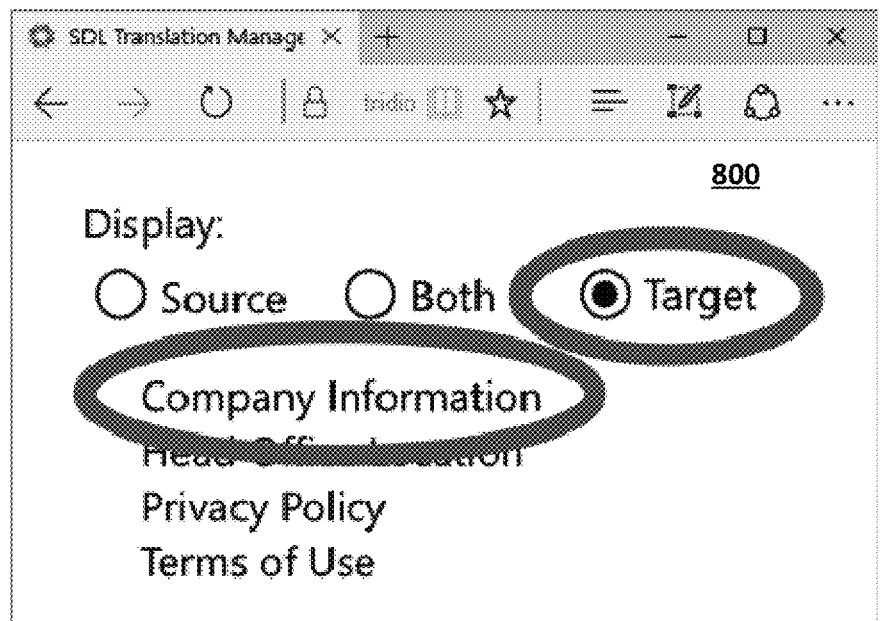
FIG. 8 is a screenshot of an example rendered list associated with various translation components of web content.

Translations already generated by the translator 702 can be stored at the WCMS 706 in some embodiments. In one embodiment, the WCMS 706 generates a rendered list that comprises the translation jobs available in the XML document. The rendered list is then transmitted back to the translator 702 through the translation preview component 708 in step 711. An example rendered list 800 is illustrated in FIG. 8. The translator can select either a source language, a target language, or both versions of the translation job (e.g., web content with translation components), as well as what document or portion of the web content is requiring translation. In this instance, the translator has requested to view the target language version of a company information webpage.

In sum, the rendered list document comprises one or more translation components and each of the one or more translation components comprises a preview URL, a preview language, the tenant identifier, and a translation job identifier.

When the translator 702 selects one or more of the options to generate a translation preview included in the rendered list document, another request with the selections is transmitted to the WCMS 706 via the translation preview component 708.

To prepare a translation preview, the WCMS 706 transmits a request 714 in an XML format to a content staging service 716. The content staging service 716 generates an up-to-date version of the web content that was requested by the translator 702 and transmits back to the WCMS 706 as an HTML document 718.

In one embodiment, the HTML document is embedded with the translation job scripts as described above (e.g., translation components). These translation components are effectively placeholders that represent portions of the web content that require translation.

The translation preview component 708 receives the up-to-date version of the web content and then substitutes any translations for their specific translation components to generate the translation preview. Again, the translation components are each assigned a unique translation job signature that is linked to the translation job segments as illustrated in FIG. 6.

Figure 9:
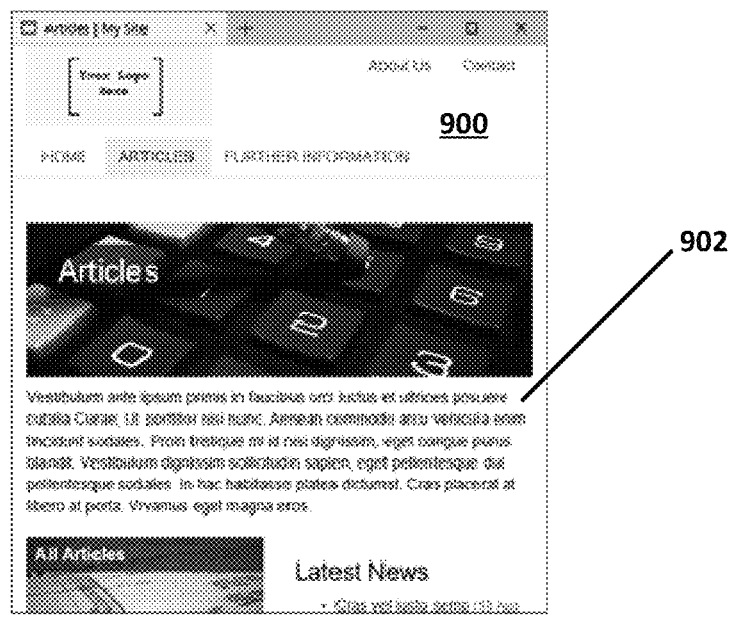
FIG. 9 is a screenshot of an example translation preview where translated content is displayed in context.

The translation preview component 708 then transmits the translation preview 720 to the translator. An example translation preview 900 is illustrated in FIG. 9. In this example, a translation component comprises a block of text 902 that has been placed into position on a web page relative to other textual content and images.

Thus, instead of operating only with the translation job segments illustrated in FIG. 6, the translator can view relevant portions of the web content to improve translation accuracy and efficiency. The translation preview allows the translator to see the translations "in context" as they are integrated into the web content as they would be seen if the web content were published.

In some embodiments, the translation preview component receives the current version of the web content and replaces the one or more translation components with translated content created by the translator to create the translation preview. These processes occur prior to transmitting the translation preview to the translation system.

Figure 10:
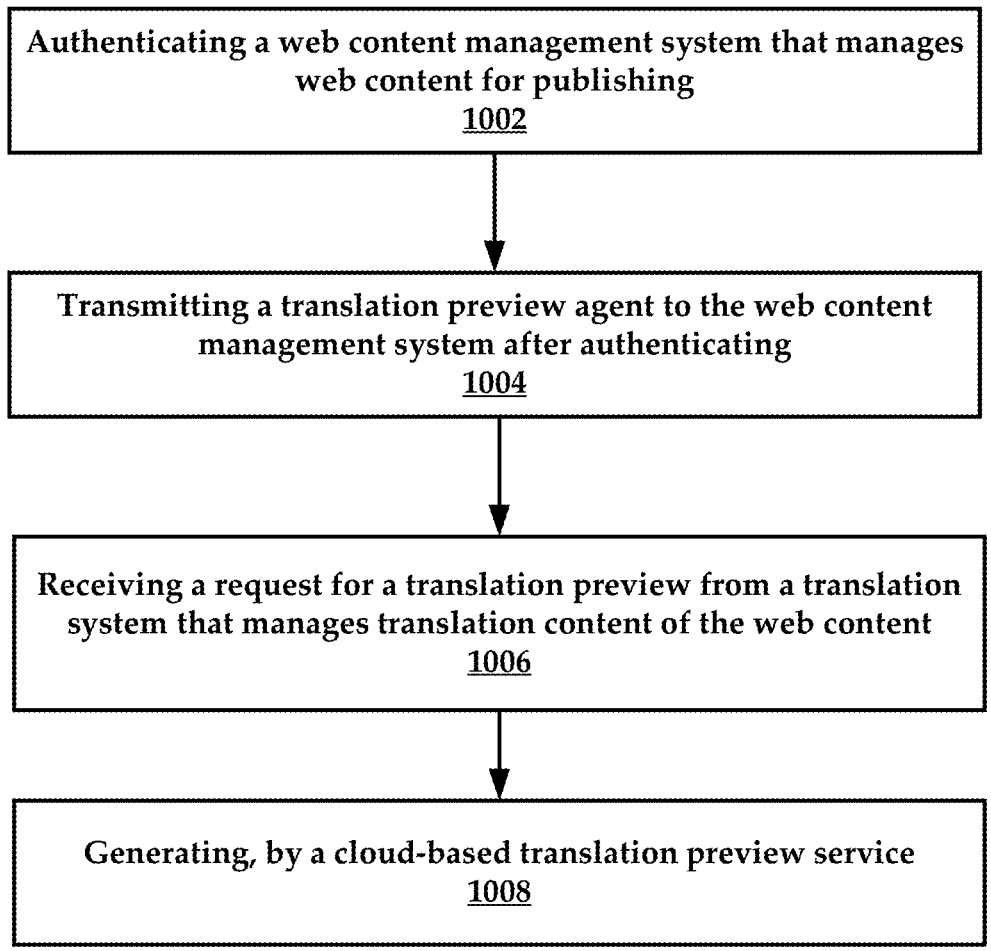
FIG. 10 is a flowchart of an example method of the present disclosure.

FIG. 10 is a flowchart of an example method of providing a translation preview service and providing a translation preview through the translation preview service. The method includes a step 1002 of authenticating a web content management system that manages web content for publishing. This can include authenticating a tenant identifier, a client key, and a client secret value, or any combinations thereof.

Next, the method includes a step 1004 of transmitting a translation preview agent to the web content management system after authenticating. The translation preview agent is then installed on the web content management system. In effect, communications related to translation previews (requests and responses) are effectuated at the web content management system by the translation preview agent. Thus, the translation preview agent cooperates with the translation preview service or component executing within the cloud.

Each additional call to the web content management system to receive or transmit a document within a process to provide a translation preview can require authentication of the web content management system. This level of authentication ensures that private web content is not exposed at any stage of the translation process.

In one embodiment, the method includes a step 1006 of receiving a request for a translation preview from a translation system that manages translation content of the web content. Again, this can occur when a translator wishes to see a translated segment in context. For example, the translator is translating a segment of a body of an article that will be published online. To aid in translation, the translator may opt to view surrounding textual content or images of the web content.

In some embodiments, the method includes a step 1008 of generating, by a cloud-based translation preview service. As mentioned above, the translation preview of the web content with the translated content that is illustrated or embedded within the web content to maintain context for a translator. This process can include obtaining the current translations for the web content and an up-to-date version of the web content. The translation preview service selectively replaces translation components (e.g., placeholders that identify where translations should go) with their respective translations to generate the translation preview. Again, this could include using a preview URL, a translation identifier or signature, and so forth.

Figure 11:
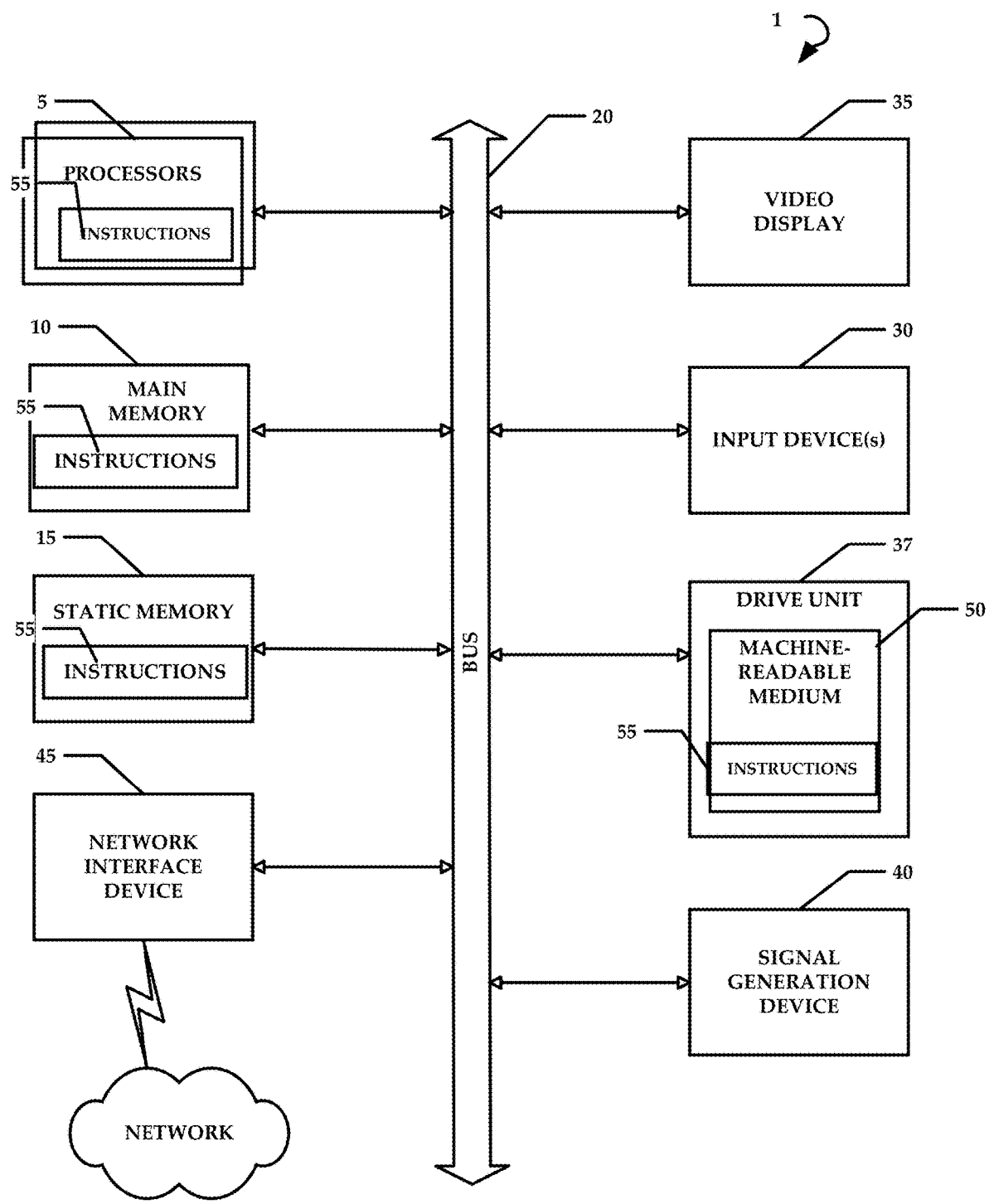
FIG. 11 is a diagrammatic representation of an example machine in the form of a computer system.

FIG. 11 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
a web content management system comprising a processor, and a memory coupled to the processor, the memory storing instructions executable by the processor for managing web content for publishing;
a translation preview agent that has been installed within the web content management system behind logical and physical security of the web content management system, and that inserts a plurality of component scripts into web content, when a plurality of translation jobs are required for the web content; and
a translation system comprising a translation system processor and a translation system memory coupled to the translation system processor, the translation system memory storing instructions executable by the translation system processor for managing translation content of the web content,
the translation system in communication with the web content management system and integrated via a cloud-based translation preview service executing within a cloud,
the translation preview service generating a translation preview of the web content with the translated content that is embedded within the web content to maintain context for a translator,
the translation preview service comprising a translation preview component executing within the cloud that facilitates translation job requests from the web content management system to the translation management system, and
facilitates requests for translation previews from the translation management system to the web content management system, and
the translation preview agent installed prior to usage of the translation preview component.

2. The system according to claim 1, further comprising a security service that authenticates the web content management system prior to installation of the translation preview agent.

3. The system according to claim 2, wherein the security service authenticates requests to the web content management system from the translation system for the translation preview.

4. The system according to claim 2, wherein the security service authenticates the web content management system using a tenant identifier, a client key, and a client secret value.

5. The system according to claim 4, wherein the translation preview agent generates a rendered list document that comprises one or more translation components, each of the one or more translation components comprising a preview URL, a preview language, the tenant identifier, and a translation job identifier.

6. The system according to claim 5, wherein the translation preview service receives a selection of one of the one or more translation components from the translation system.

7. The system according to claim 6, further comprising a staging server that provides a current version of the web content to the web content management system during generation of the translation preview.

8. The system according to claim 7, wherein the translation preview service:
receives the current version of the web content;
replaces the one or more translation components with the translated content to create the translation preview; and
transmits the translation preview to the translation system.

9. The system according to claim 8, wherein translated content is stored in the web content management system prior to the content staging system providing the current version of the web content.

10. The system according to claim 1, wherein the translation system obtains a current version of the web content through the translation preview service using the translation preview agent that is set behind a security firewall of the web content management system.

* * * * *